US008827784B2

(12) United States Patent
Kotsugai et al.

(10) Patent No.: US 8,827,784 B2
(45) Date of Patent: Sep. 9, 2014

(54) GAME DEVICE, GAME CONTROL PROGRAM, AND METHOD FOR CONTROLLING GOLF GAME

(75) Inventors: Yoshinori Kotsugai, Tokyo (JP); Kentaro Suzuki, Tokyo (JP); Masashi Muramori, Kanagawa (JP); Hirofumi Hashimoto, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 7 days.

(21) Appl. No.: 13/486,053

(22) Filed: Jun. 1, 2012

(65) Prior Publication Data

US 2012/0309478 A1 Dec. 6, 2012

(30) Foreign Application Priority Data

Jun. 3, 2011 (JP) ................................. 2011-125714
Jun. 3, 2011 (JP) ................................. 2011-125715
Jun. 3, 2011 (JP) ................................. 2011-125716

(51) Int. Cl.
*A63F 13/04* (2006.01)
*A63F 13/10* (2006.01)

(52) U.S. Cl.
CPC ..................................... *A63F 13/10* (2013.01)
USPC ............................................................ 463/3

(58) Field of Classification Search
CPC . A63F 13/04; A63F 13/10; A63F 2300/1068; A63F 2300/1075; A63F 2300/8011
USPC ............................................................ 463/3
See application file for complete search history.

(56) References Cited

U.S. PATENT DOCUMENTS

| | | | | |
|---|---|---|---|---|
| 6,217,444 | B1 * | 4/2001 | Kataoka et al. | 463/3 |
| 6,626,756 | B2 * | 9/2003 | Sugimoto | 463/4 |
| 7,297,056 | B2 * | 11/2007 | Takahashi et al. | 463/3 |
| 7,658,676 | B2 * | 2/2010 | Ohta | 463/37 |

(Continued)

FOREIGN PATENT DOCUMENTS

| | | |
|---|---|---|
| JP | 2005-143714 | 6/2005 |
| JP | 2005-267006 | 9/2005 |

(Continued)

OTHER PUBLICATIONS

Maxamaul. Sid Meier's SimGolf P1 [online]. Oct. 6, 2012 [retrieved on Sep. 6, 2013]. Retrieved from the Internet:< URL: http://www.youtube.com/watch?v=mT5xGkohuok>.*

(Continued)

*Primary Examiner* — Dmitry Suhol
*Assistant Examiner* — David Duffy
(74) *Attorney, Agent, or Firm* — Katten Muchin Rosenman LLP

(57) ABSTRACT

A game device includes: a screen image generating unit that generates and displays an image of a golf course, a landing point control unit that displays a marker indicating a predicted landing point of a ball, and a shot control unit operative to control a shot. Upon receiving an input instruction for moving the position of the marker, the landing point control unit moves the position of the marker by, changing the azimuth angle of the marker in a continuous manner along with a movement of an indicated position and by changing the radius of the marker discretely, when the position of the marker is represented by a two-dimensional polar coordinate system of which the origin point is a current ball position.

9 Claims, 13 Drawing Sheets

(56) References Cited

U.S. PATENT DOCUMENTS

| | | | |
|---|---|---|---|
| 2001/0011035 A1* | 8/2001 | Sugimoto | 463/3 |
| 2004/0248630 A1* | 12/2004 | Hodgson et al. | 463/3 |
| 2007/0184884 A1* | 8/2007 | Okamoto et al. | 463/3 |
| 2010/0099473 A1* | 4/2010 | Ikejiri et al. | 463/3 |
| 2012/0077557 A1* | 3/2012 | Miki | 463/3 |
| 2012/0262471 A1* | 10/2012 | Muramori et al. | 345/582 |
| 2012/0309477 A1* | 12/2012 | Mayles et al. | 463/3 |

FOREIGN PATENT DOCUMENTS

| | | |
|---|---|---|
| JP | 2008-067876 | 3/2008 |
| JP | 2009-187290 | 8/2009 |
| JP | 2010-246613 | 11/2010 |

OTHER PUBLICATIONS

Sid Meier's SimGolf [online]. Jan. 29, 2002 pretrieved on Jan. 15, 2014]. Retreived from the Internet:< URL: http://www.ign.com/articles/2002/01/30/sid-meiers-simgolf>.*

Notification of Reason(s) for Refusal dated Jul. 2, 2013 from Japanese Application No. 2011-125715.

Notification of Reason(s) for Refusal dated Jul. 2, 2013 from Japanese Application No. 2011-125716.

"SimAnimals", Nintendo DREAM, Mainichi Communications Inc., Mar. 1, 2009, vol. 14, No. 3, Total Issue No. 179, p. 46-47.

"Hu PGA Tour Power Golf 2—Golfer", Game software manual, Hudson Soft Company, Limited, Aug. 2, 2004, p. 2, 8-10.

* cited by examiner

GAME DEVICE, GAME CONTROL PROGRAM, AND METHOD FOR CONTROLLING GOLF GAME

BACKGROUND OF THE INVENTION

1. Field of the Invention
[Technical Field]

The present invention generally relates to game control technology, and more particularly, to a game device, a game control program, and a method for controlling a golf game.

The present invention also generally relates to a mobile terminal, and more particularly, to a mobile terminal provided with a touch panel, a control method, and a program.

2. Description of the Related Art
[Background Art]

Games wherein a user controls a character so as to play golf have gained popularity. Also in the real world, there are a lot of people from a wide range of ages who play golf, thus golf is a sport having universal popularity.

A number of golf games are available in the market. However, since the style of competition thereof is simple by nature, it is difficult to add a flavor on a golf game and most of the golf games have nothing new or special. The present inventors recognize that it is necessary to provide an interface with an excellent operability in order to enhance an entertainment experience attained by a golf game, and have developed a new interface technology.

SUMMARY OF THE INVENTION

In this background, a purpose of the present invention is to provide a technology for controlling a game having a higher enjoyment level.

Another purpose of the present invention is to provide a user interface technology with high user friendliness.

According to an aspect of the present invention, a game control program embedded on a non-transitory computer-readable recording medium is provided. The game control program allows a computer to function as: a screen image generating unit operative to read out data of a golf course from a storage device, operative to generate an image of the golf course, and operative to display the image on a display device; a landing point control unit operative to display a marker in the image of the golf course generated by the screen image generating unit, the marker indicating a predicted landing point of a ball when a player's character takes a shot; and a shot control unit operative to control a shot taken by the player's character. Upon receiving an instruction for moving the position of the marker, the instruction having been input through an input device from a player, the landing point control unit moves the position of the marker by changing the azimuth angle of the marker position in a continuous manner along with a movement of an indicated position that is indicated by the input instruction and by changing the radius of the marker position discretely, when the position of the marker is represented by a two-dimensional polar coordinate system of which the origin point is a current ball position.

According to another aspect of the present invention, also a game control program embedded on a non-transitory computer-readable recording medium is provided. The game control program allows a computer to function as: an acquiring means operative to acquire the orientation of an input device, which receives an instruction input by a player and which is held by the player, from a sensor for detecting the orientation of the input device; a displaying means operative to read out data of a golf course from a storage device, operative to generate an image of the golf course, and operative to display the image on a display device; a determining means operative to determine the power or the impact of a shot taken by a player's character controlled by the player, in accordance with the timing of an instruction that is input by the player and is received through the input device; a calculating means operative to calculate the ballistic trajectory of a ball shot by the player's character in accordance with the power or the impact determined by the determining means; and a measuring means operative to measure success or failure of the shot and in case the shot is measured as success, operative to allow the determining means to determine the power or the impact higher than that of a shot that is measured as failure. The measuring means: executes a first measurement so as to acquire the orientation of the input device from the sensor at a predetermined time point after a shot by the player's character is started, as to define the orientation at the predetermined time point as a reference orientation, as to acquire an orientation of the input device from the sensor after that, and as to measure whether or not the input device rotates more than or equal to a predetermined first angle from the reference orientation around a predetermined axis; further executes a second measurement so as to acquire the orientation of the input device from the sensor at a time point when the determining unit receives an input instruction, as to compare the orientation of the input device at that time point with the reference orientation, and as to measure whether or not the orientation of the input device at that time point is within a predetermined second angle from the reference orientation around the predetermined axis; and measures that the shot succeeds if both of the first measurement result and the second measurement result are positive.

According to yet another aspect of the present invention, a mobile terminal is provided. The mobile terminal can be held by a user and includes: a display device; a touch panel operative to detect contact with the display surface of the display device; a rear touch panel provided on the other side of a surface on which the touch panel is mounted; a control unit operative to control an screen image to be displayed on the display device; in case the control unit acquires an input to the touch panel and concurrently acquires an input to the rear touch panel in a region locating within a predetermined range from a position corresponding to the input position on the touch panel, the control unit determines that the user pinches an object displayed on the display device at the input position, performs a predetermined process on the object, and reflects the processing result on the screen image.

Optional combinations of the aforementioned constituting elements, and implementations of the invention in the form of methods, apparatuses, systems, or the like may also be practiced as additional modes of the present invention.

DETAILED DESCRIPTION OF THE INVENTION

Mode for Carrying out the Invention

The invention will now be described by reference to the preferred embodiments. This does not intend to limit the scope of the present invention, but to exemplify the invention.

A game device according to an exemplary embodiment controls a game that controls a player's character so as to play golf.

Figure 1:
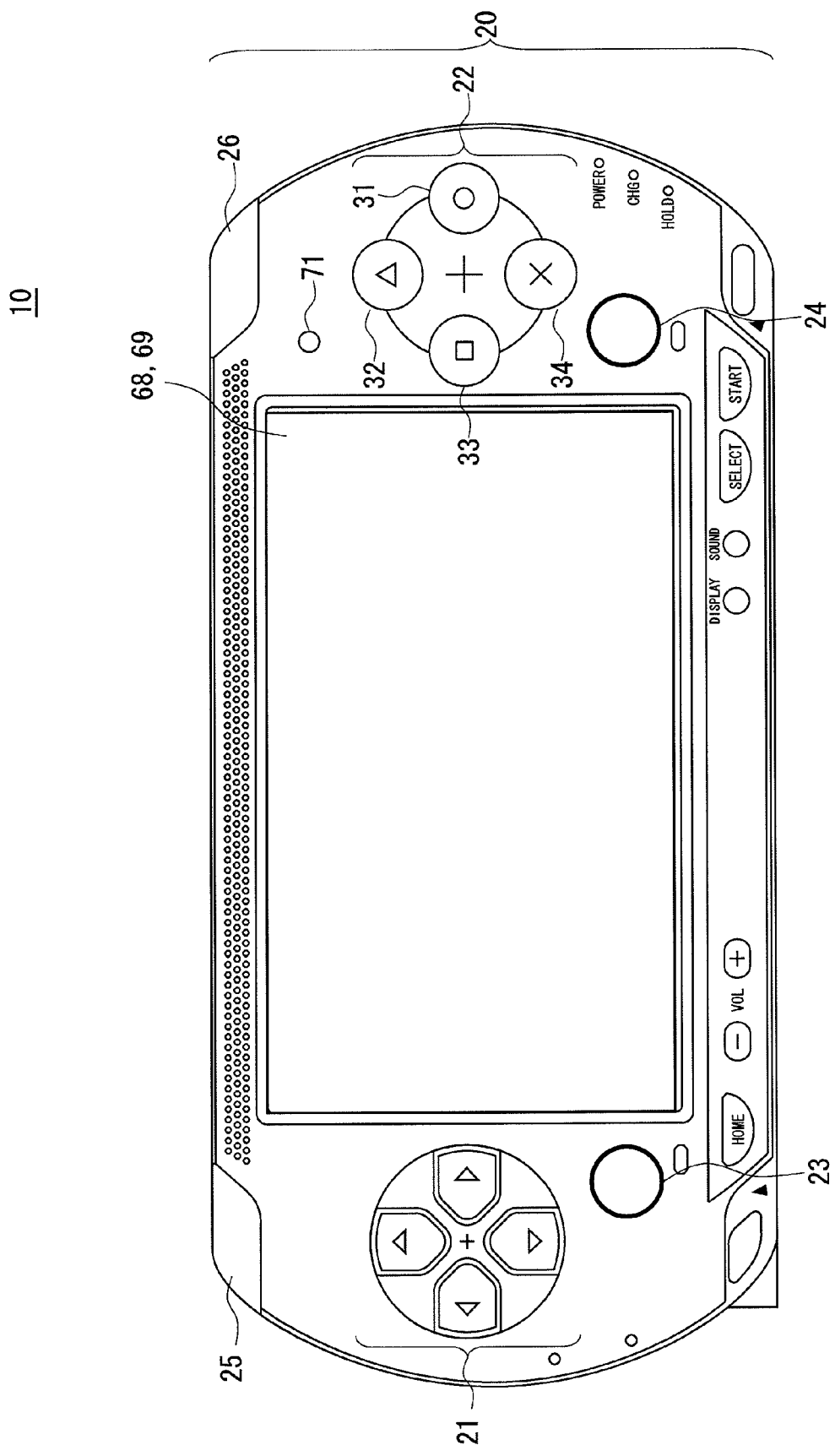
FIG. 1 shows an external view of a game device according to an exemplary embodiment.
Figure 2:
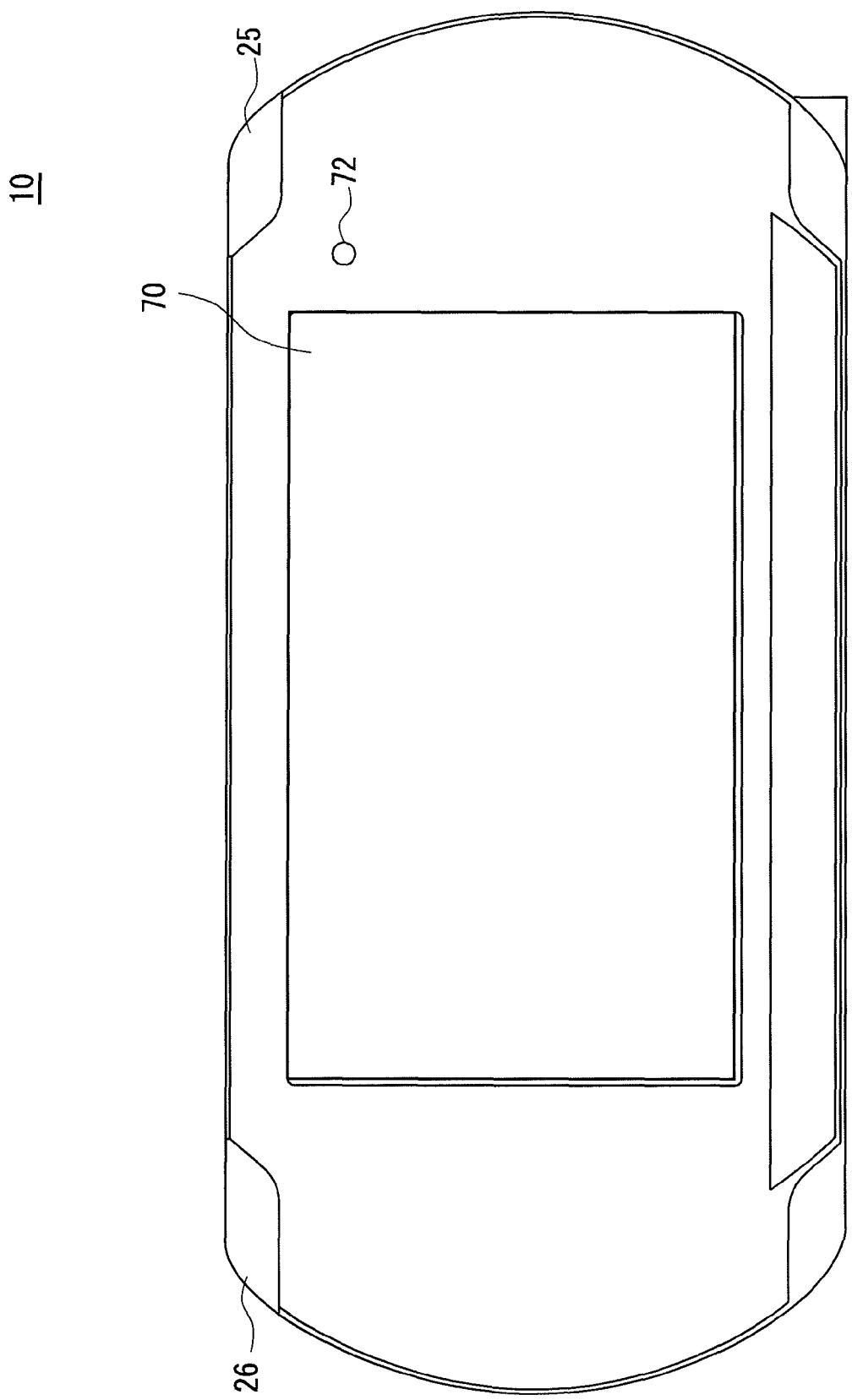
FIG. 2 shows an external view of the game device according to the exemplary embodiment.

FIGS. 1 and 2 show an external view of the game device 10 according to the exemplary embodiment. The game device 10 shown in FIGS. 1 and 2 are a portable game device that a player holds and uses. As shown in FIG. 1, on the front side of the game device 10 (i.e., the side facing to a player when the player holds and manipulates the game device 10), an input device 20 including directional keys 21, buttons 22, a left analogue stick 23, a right analogue stick 24, a left button 25, a right button 26, or the like, a display device 68, and a front camera 71 are provided. With the display device 68, a touch panel 69 for detecting contact made by a finger of a player, a stylus pen, or the like is provided. The buttons 22 include a circle button 31, a triangle button 32, a square button 33, and a cross button 34.

As shown in FIG. 2, on the backside of the game device 10, a rear touch panel 70 and a rear camera 72 is provided. Although a display device may be provided also on the backside of the game device 10 in a similar manner with that of the front side, a display device is not provided on the backside of the game device 10 and only the rear touch panel 70 is provided according to the exemplary embodiment.

A player can, for example, manipulate the buttons 22 with his/her right hand thumb, manipulate the directional keys 21 with his/her left hand thumb, manipulate the right button 26 with his/her right hand index finger or middle finger, manipulate the left button 25 with his/her left hand index finger or middle finger, manipulate the touch panel 69 with his/her thumbs of both hands, and manipulate the rear touch panel 70 with his/her ring fingers or pinky fingers of both hands while holding the game device 10 with his/her both hands. In case of using a stylus pen, or the like, for example, the player can manipulate the touch panel 69 and the buttons 22 with the right hand by using the stylus pen or by using the index finger, manipulate the directional keys 21 with the left hand thumb, manipulate the left button 25 with the left hand index finger or middle finger, and manipulate the rear touch panel 70 with the left hand ring finger or the pinky finger while holding the game device 10 with the left hand.

Figure 3:
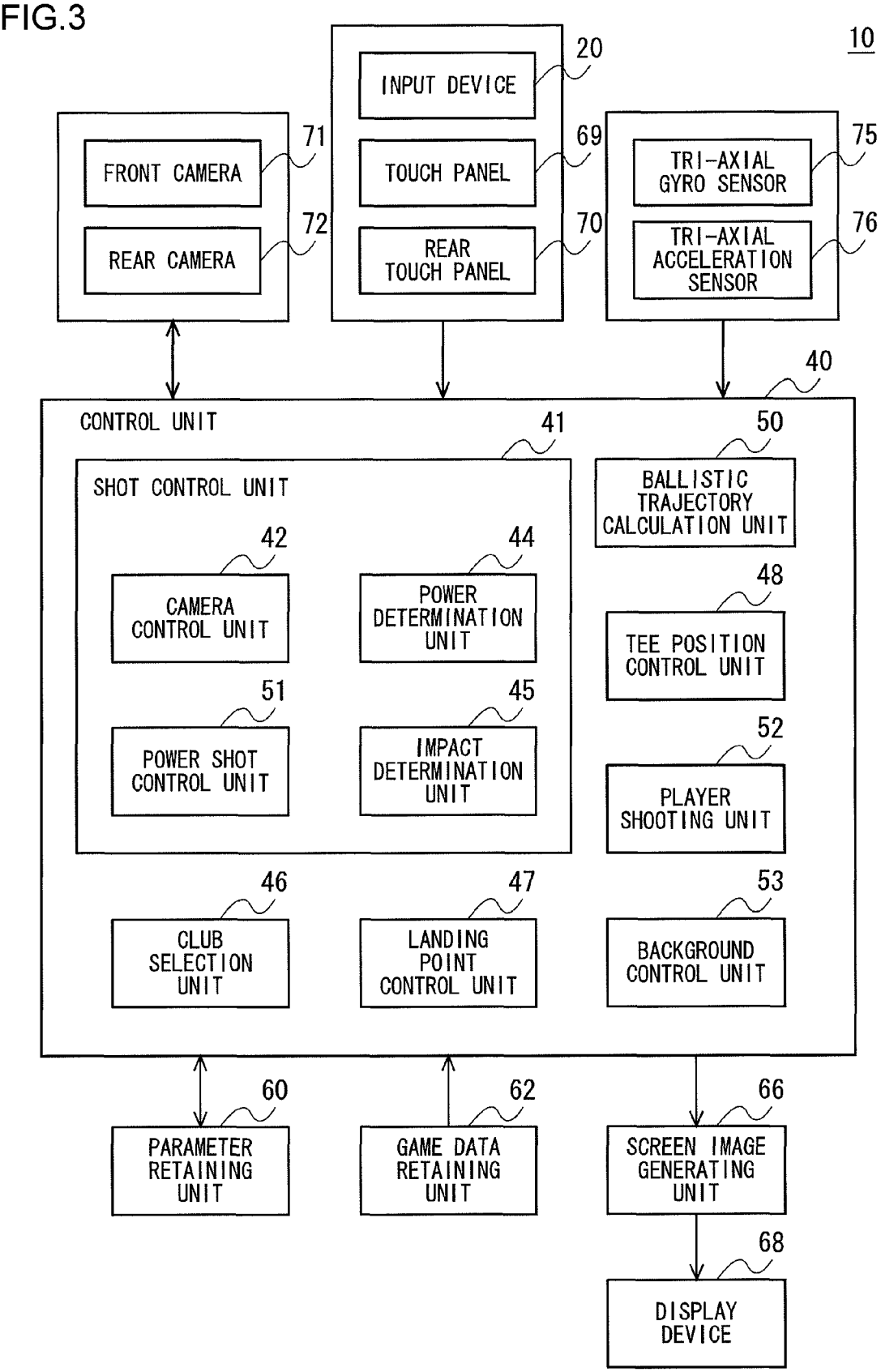
FIG. 3 shows a structure of the game device according to the exemplary embodiment.

FIG. 3 shows the structure of the game device 10 according to the exemplary embodiment. The game device 10 comprises the input device 20, a control unit 40, a parameter retaining unit 60, a game data retaining unit 62, a screen image generating unit 66, the display device 68, the touch panel 69, the rear touch panel 70, the front camera 71, the rear camera 72, a tri-axial gyro sensor 75, and a tri-axial acceleration sensor 76. Those elements are implemented by a CPU of a computer, memory, a program loaded into the memory, or the like in terms of hardware components. FIG. 3 depicts functional blocks implemented by cooperation of these components. Therefore, it will be obvious to those skilled in the art that the functional blocks may be implemented in a variety of ways, by hardware only, software only, or a combination thereof.

The front camera 71 captures an image of the front side of the game device 10. The rear camera 72 captures an image of the backside of the game device 10. The input device 20, the touch panel 69, and the rear touch panel 70 are provided on the surface of a housing of the game device 10, as described above, and receive an operation input by a user.

The tri-axial gyro sensor 75 detects an angular speed in each of an XZ plane, a ZY plane, and a YX plane of the game device 10. The tri-axial gyro sensor 75 may be a mechanical gyro sensor such as a rotor gyro or a vibration gyro, or may be a fluidic gyro sensor or an optical gyro sensor. By integrating an angular speed around each of the three axes detected by the tri-axial gyro sensor 75, a rotation amount around each of the three axes can be calculated.

The tri-axial acceleration sensor 76 incorporates a mass supported by a beam. By detecting the change of the position of the mass caused by acceleration, the tri-axial acceleration sensor 76 detects the acceleration of the game device 10 in each of the three-axis direction, X, Y, and Z. The tri-axial acceleration sensor 76 may be a mechanical, optical, or semi-conductor acceleration sensor. By using the tri-axial acceleration sensor 76, the relative angle of each of the three axes X Y and Z of the game device 10 to the direction of the gravitational acceleration can be detected, which enables the calculation of the orientation of the game device 10. By integrating the acceleration in each of the three axes, the velocity can be calculated, and by further integrating, the distance of movement can be calculated.

The control unit 40 reads out a program from the game data retaining unit 62 that stores the program of the golf game and executes the program so as to make the game progress while controlling the motion of the player's character, which functions as a golf player in the game world, on the basis of an received operation that has been input via the input device 20, the touch panel 69, the rear touch panel 70, or the like from a player. The parameter retaining unit 60 retains a parameter necessary for the progression of the golf game. The screen image generating unit 66 generates a game screen image that is controlled by the control unit 40 and allows the display device 68 to display the screen image.

The control unit 40 includes a shot control unit 41, a club selection unit 46, a landing point control unit 47, a tee position control unit 48, a ballistic trajectory calculation unit 50, a player shooting unit 52, and a background control unit 53. The shot control unit 41 controls a shot taken by a player's character. The shot control unit 41 includes a camera control unit 42, a power determination unit 44, an impact determination unit 45, and a power shot control unit 51.

Figure 4:
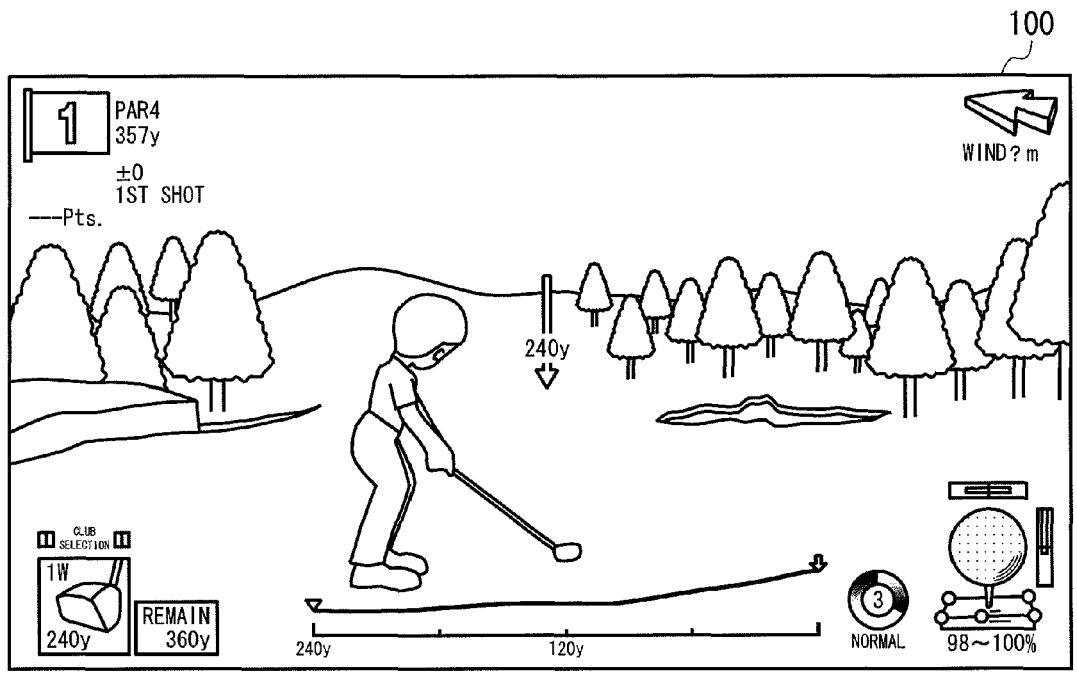
FIG. 4 shows an exemplary game screen image where a player's character takes a shot.

FIG. 4 shows an exemplary game screen image where a player's character takes a shot. In the shot screen image 100, an image where geographic features of a course where golf is played and an image where the player's character is viewed from the rear are displayed. While this screen image is displayed, a player manipulates the input device 20 so as to determine the power, the impact, the direction of a shot, and allows the player's character to take the shot.

Before the player's character hits a shot, the club selection unit 46 selects a club for hitting the shot in accordance with an instruction input by the player. When the player's character has a turn to hit his/her next shot, the club selection unit 46 refers to a parameter indicating the ability of the player's character and an average shot distance for each golf club that the player's character can use that are stored in the game data retaining unit 62, calculates the shot distance for each club, and stores the distances in the parameter retaining unit 60. Then the club selection unit 46 calculates remaining yards from the present position of a ball to a pin, compares the remaining yards with the shot distance of each club, and selects and sets an optimum club. Upon receiving an input through the left button 25 from the player, the club selection unit 46 displaces the selected club with a club of a shot distance shorter by one step, and upon receiving an input through the right button 26, the club selection unit 46 displaces the selected club with a club of a shot distance longer by one step.

The camera control unit 42 controls the point of view position and the line of sight direction of a camera when the screen image generating unit 66 generates a game screen image. In case of generating a game screen image where a player's character takes a shot, the camera control unit 42 defines the rear of the player's character as a default setting of the point of view position and defines a direction to see the player's character as a default setting of the line of sight direction. The player can manipulate the input device 20 so as to change the point of view position and/or the line of sight direction in order to check the geographic features of a golf course and/or in order to determine a direction and/or a distance to take a shot. Upon receiving an input through the triangle button 32 while the shot screen image 100 is displayed, the camera control unit 42 defines the point of view position as a position obliquely above a landing point of a ball predicted in case that a shot is taken by the club currently selected and makes a shift to a screen image that displays an area in the vicinity of the predicted landing point.

Figure 5:
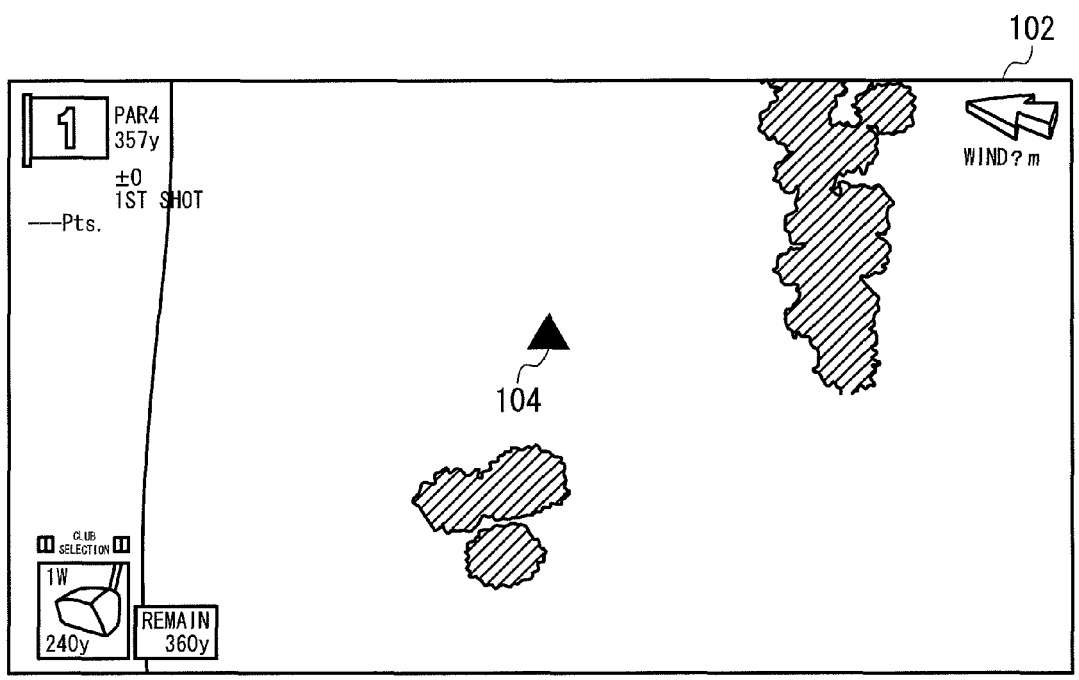
FIG. 5 shows an exemplary game screen image displaying an area in the vicinity of a predicted landing point of a ball.

FIG. 5 shows an exemplary game screen image displaying the area in the vicinity of the predicted landing point of a ball. Displayed on the landing site screen image 102 are an image where the area in the vicinity of the predicted landing point is viewed from obliquely above the area, and a marker 104 that indicates the landing point of a ball predicted in case that a shot is taken straightly with optimum values both in the power and the impact. While this landing site screen image 102 is displayed, the player can manipulate the left analogue stick 23 so as to move the point of view position of the camera and can check the geographic features of the golf course in the vicinity of the landing point of the ball, etc. Upon receiving an input through the cross button 34 while the landing site screen image 102 is displayed, the camera control unit 42 makes a shift to the shot screen image 100.

Upon receiving a drag manipulation on the landing site screen image 102 shown in FIG. 5, on the touch panel 69 at the position where the marker 104 is displayed, the landing point control unit 47 moves the marker 104 along with a movement of an indicated position that is indicated by a finger or a thumb of the player. A leftward or rightward shift of the marker 104, which is the change in the azimuth angle when represented by a two-dimensional polar coordinate system, corresponds to the change of a direction of a shot to be taken by the player's character. Thus, the landing point control unit 47 instructs the shot control unit 41 to change the direction of the shot to be taken by the player's character, as well as changing the azimuth angle of the marker 104 in a continuous manner. By contrast, a backward or forward (upward or downward on the screen) shift of the marker 104, which is the change in the radius when represented by a two-dimensional polar coordinate system, corresponds to the strength of a shot. Since the player should hit a ball so as to control the strength of a shot by adjusting the power or the impact, the landing point control unit 47 does not change the radius of the marker 104 in a continuous manner. In case that the user moves the marker 104 forward or backward by more than or equal to a predetermined amount, the marker 104 is moved intermittently among positions corresponding to respective shot distances of clubs, by changing a club to be used for a shot. That is, the radius of the marker 104 is changed intermittently among a plurality of values that are defined in advance as an average shot distance when the player's character takes a shot by using an available club and that are stored in the parameter retaining unit 60, the game data retaining unit 62, or the like.

Figure 6:
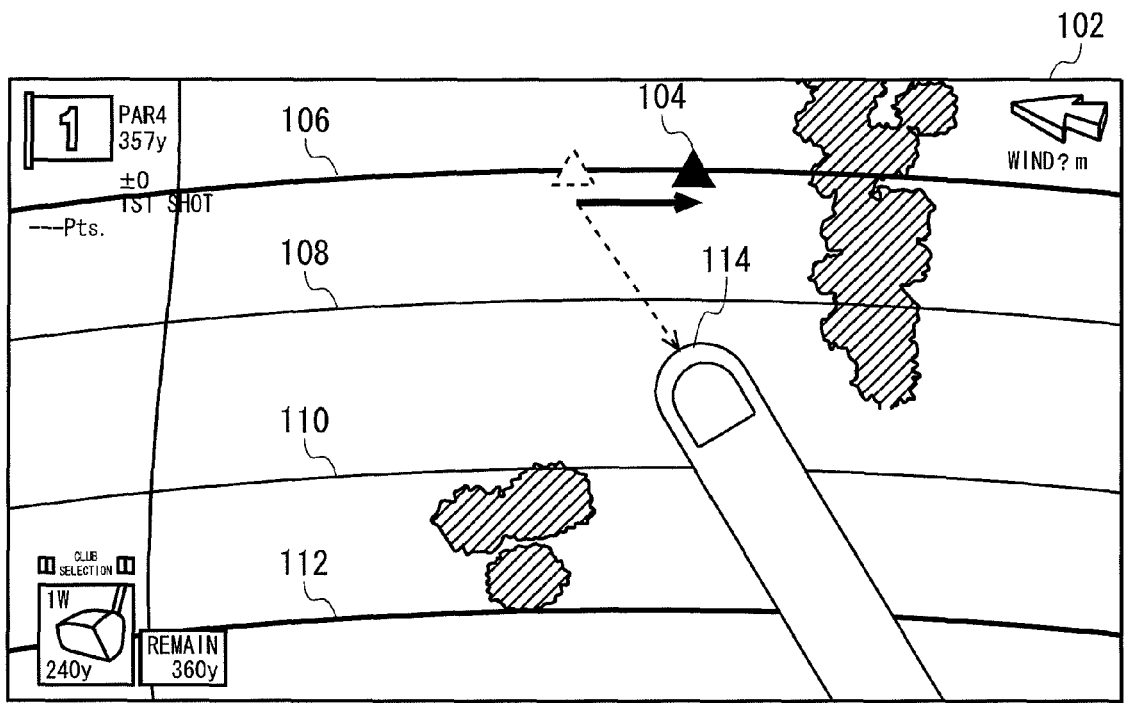
FIG. 6 is a diagram for illustrating an appearance where the position of a marker indicating the landing point of a ball is changed.
Figure 7:
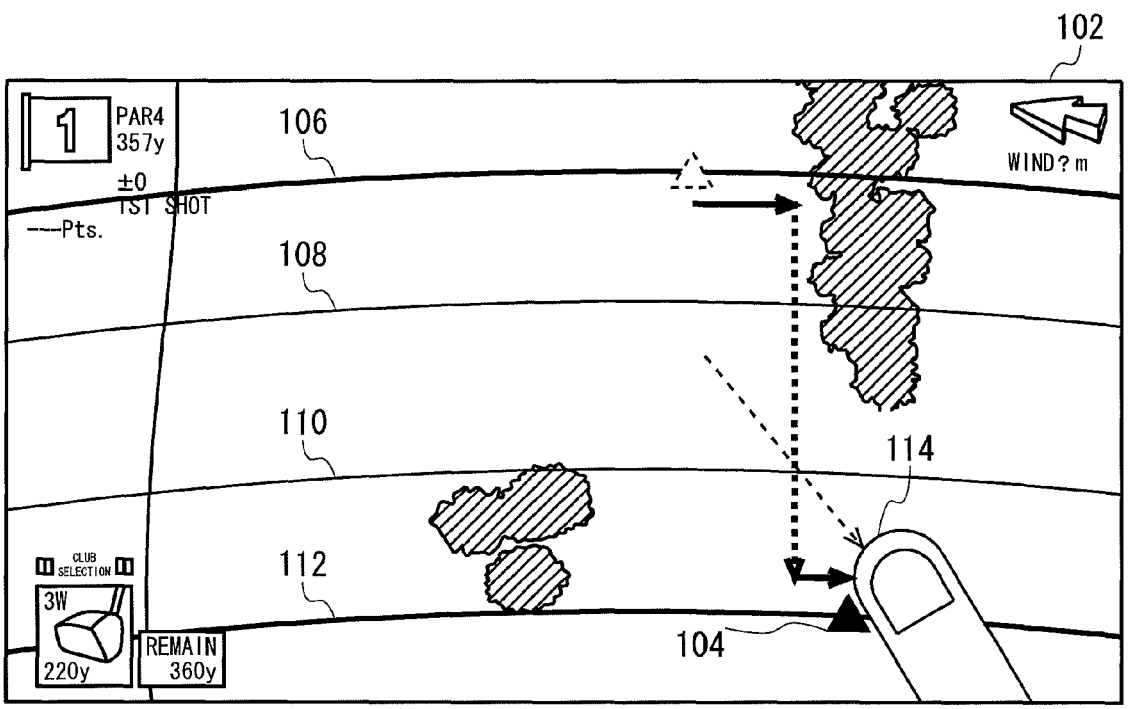
FIG. 7 is a diagram for illustrating an appearance where the position of the marker indicating the landing point of a ball is changed.

FIGS. 6 and 7 are diagrams for illustrating an appearance where the position of the marker indicating the landing point of a ball is changed. A player drags the marker 104 by a finger or a thumb in the lower right direction, and the landing point control unit 47 acquires the position of the finger or the thumb as an indicated position 114. In case the distance between the current ball position and the indicated position 114 falls within a predetermined range of which the lower limit is the distance of the radius of an arc 110 and of which the upper limit is the distance of the radius of an arc (not shown), the marker 104 is moved as shown in FIG. 6 to the position of the intersection of an arc 106 and a line connecting the current ball position and the indicated position 114, wherein the radius of the arc 106 represents the shot distance expected in case that the player's character takes a shot by using the club currently selected. That is, the marker 104 is moved along the arc 106 and not moved in the direction parallel to a line connecting the current ball position and the marker 104. The landing point control unit 47 instructs the shot control unit 41 to change the direction of a shot to be taken by the player's character to the direction of a line connecting the current ball position and the position of the marker 104 after the move.

In case that the distance between the current ball position and the indicated position 114 falls out of the predetermined range, for example, in case that the indicated position 114 is nearer to the current ball position than the arc 110 as shown in FIG. 7, the landing point control unit 47 instructs the club selection unit 46 to switch to a club for a distance shorter by one step. In addition, the landing point control unit 47 moves the marker 104 to the position of the intersection of an arc 112 and a line connecting the current ball position and the indicated position 114, wherein the radius of the arc 112 represents the distance of a shot predicted in case that the player's character takes the shot by using the newly selected club.

In case that the player drags the marker 104 upward by a finger or a thumb from a status shown in FIG. 7, when the indicated position 114 moves across an arc 108, the landing point control unit 47 instructs the club selection unit 46 to switch to a club of a shot distance longer by one step, and moves the marker 104 onto the arc 106. That is, a first distance that corresponds to the arc 110 and that functions as a threshold value for switching from a first club, of which the shot distance corresponds to the arc 106, to a second club, of which the shot distance corresponds to the arc 112 and of which the shot distance is shorter by one step, is shorter than a second distance that corresponds to the arc 108 and that functions as a threshold value for switching from the second club to the first club. In other words, a range of the indicated position 114 where the selection of the first club is maintained and a range of the indicated position 114 where the selection of the second club is maintained overlap at least partly. In this manner, by providing hysteresis when switching clubs, a situation where clubs are often switched when the indicated position is in the vicinity of a boundary area can be avoided. This can provide a user interface with favorable operability. The arcs 106 and 112 indicating the shot distance of clubs and/or the arcs 108 and 110 indicating threshold values for switching clubs may be displayed or may not be displayed on the landing site screen image 102.

The club selection unit 46 may receive an input via the left button 25 or via the right button 26 also when the landing site screen image 102 is displayed and may switch clubs. In this process, along with the switching of the clubs, the landing point control unit 47 moves the marker 104 onto an arc that corresponds to the shot distance of a club after the switch.

In case the currently selected club is a 1 wood (a driver), since there is no club providing a shot distance longer than that, the selected club can be switched only to a club providing a shorter shot distance. Therefore, in case that a club of which the shot distance is longer than a predetermined value is selected, the camera control unit 42 may define the point of view position of the camera so that the marker 104 is located in the upper half of the screen image when displaying the landing site screen image 102 in order to allow a region that positions nearer than the marker 104 to the current ball position to be displayed larger than a farther region. By contrast, in case that a club of which the distance is shorter than the predetermined value is selected (e.g., in case that the currently selected club is a 9 iron, a wedge, or the like) the camera control unit 42 may define the point of view position of the camera so that the marker 104 is located in the lower half of the screen in order to allow the region that positions farther than the marker 104 to the current ball position to be displayed larger than the nearer region. This can provide a user interface with favorable operability.

In case that a player drags a finger or a thumb in a predetermined region near the left, right, top or bottom side on the landing site screen image 102, the camera control unit 42 moves the point of view position of the camera in that direction and the screen image is scrolled. If the player detaches the thumb or finger so as to stop the drag manipulation, the camera control unit 42 may define the point of view position of the camera so that the current position of the marker 104 moves to the center. Alternatively, in case that a club of which the shot distance is longer than or shorter than the predetermined value is selected as described above, the camera control unit 42 may define the point of view position of the camera so that the position of the marker 104 is moved to a predetermined position in the upper half or in the lower half of the screen image.

Although in the example described above, an explanation has been made on a case wherein the indicated position is moved by a drag manipulation on the touch panel 69, the indicated position may be moved by using the directional keys 21, the analogue stick, or the like, or may be moved by using a pointing device, such as a mouse, or the like.

Before the player's character hits a tee shot, the tee position control unit 48 determines a position for teeing up a ball in accordance with an instruction input by a player. In the shot screen image 100 for hitting a tea shot shown in FIG. 4, upon receiving an input by tapping on the touch panel 69 at the position where the ball is displayed, the tee position control unit 48 makes a shift to a game screen image that displays the tee ground and receives an input instruction for changing the position for teeing up a ball. Upon receiving an input via the directional keys 21, the tee position control unit 48 moves the position of the tee shot in the instructed direction.

In case the tee position control unit 48 acquires an input to the touch panel 69 at a position corresponding to a position where the player's character is displayed on the display device 68 and concurrently acquires an input to the rear touch panel 70 in a region locating within a predetermined range from a position corresponding to the input position on the touch panel 69, i.e., in case the player touches both of the touch panel 69 and the rear touch panel 70 concurrently at the positions where a player's character is displayed, as if the player holds the player's character between his/her thumb and index finger, the tee position control unit 48 determines that the player holds the player's character between his/her finger and thumb. In this process, the tee position control unit 48 displays an appearance of the player's character who is picked up. Upon detecting that the player moves the finger and the thumb holding the player's character leftward or rightward, the tee position control unit 48 moves the player's character in the instructed direction, and along therewith, moves the tee position leftward or rightward. When displaying the appearance of the player's character who is picked up, the tee position control unit 48 may display an appearance where the player's character moves as if floundering around in the air. In this case, the tee position control unit 48 controls the motion of the player's character so that the player's character moves as if floundering around. Alternatively, the tee position control unit 48 may store animation for displaying an appearance of the floundering player's character in the game data retaining unit 62 beforehand, and may read out and display the stored animation.

The tee position control unit 48 may acquire pressure when the player pinches the touch panel 69 and the rear touch panel 70 with his/her finger and thumb, and may determine the behavior of the player's character in accordance with the pressure. For example, the tee position control unit 48 may control the player's character so that the higher the pressure is, the more wildly the player's character flounders around. In case that the pressure is less than a predetermined threshold value, the tee position control unit 48 may control the player's character so as to be picked up tamely, and in case that the pressure is more than or equal to the predetermined threshold value, the tee position control unit 48 may control the player's character so as to behave as if floundering around. In case that the touch panel 69 or the rear touch panel 70 can detect pressure, or in case that a pressure sensor is provided together with the panels, the tee position control unit 48 acquires detected pressure. In case that a pressure sensor is not provided, the tee position control unit 48 may calculate pressure in accordance with an area touched by a finger or a thumb on one of or both the touch panel 69 and the rear touch panel 70. For example, the tee position control unit 48 may calculate pressure so that the larger the touched area is, the higher the pressure is.

Figure 8:
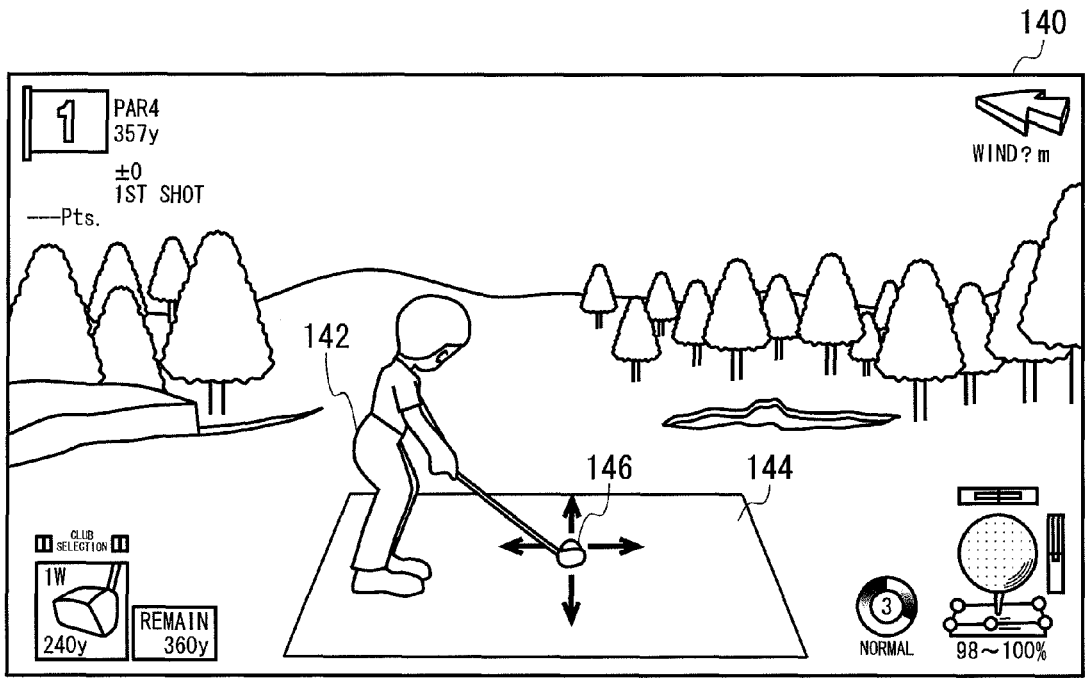
FIG. 8 shows an exemplary game screen image for changing the position of a tee shot.

FIG. 8 shows an exemplary game screen image for changing the position of the tee shot. On a teeing ground screen image 140, a player's character 142, a tee up area 144, and a ball 146 are displayed. Upon receiving a drag manipulation on the ball 146 on the touch panel 69, the tee position control unit 48 moves the ball 146 and the player's character 142 in the instructed direction in the tee up area 144.

Figure 9:
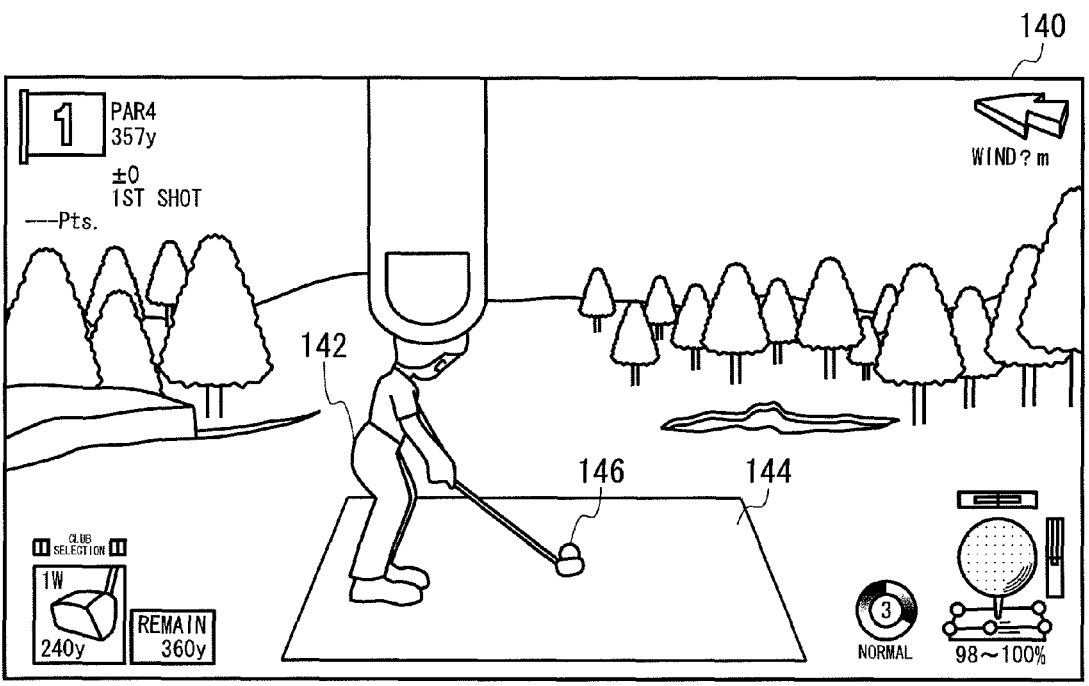
FIG. 9 shows an exemplary game screen image for changing the position of the tee shot.

FIG. 9 shows an exemplary game screen image for changing the position of the tee shot. Upon detecting contact concurrently on the touch panel 69 and the rear touch panel 70 at the position where the player's character 142 is displayed in the teeing ground screen image 140, the tee position control unit 48 displays the player's character 142 so as to behave as if the character is pinched by a finger and a thumb of the player and is picked up.

Figure 10:
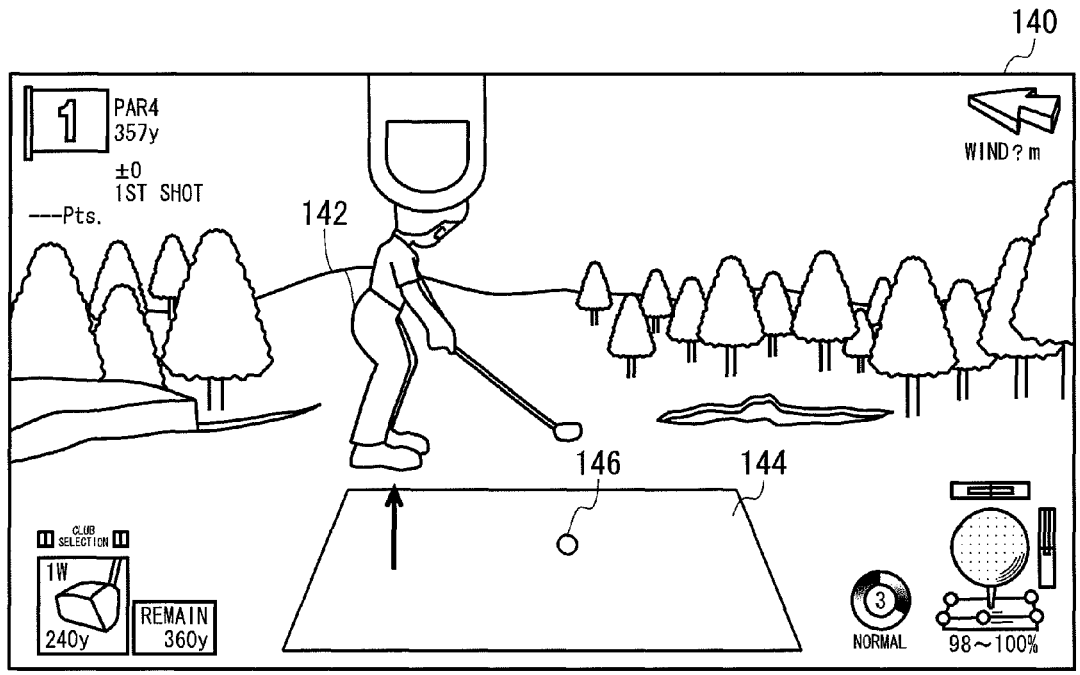
FIG. 10 shows an exemplary game screen image for changing the position of the tee shot.

FIG. 10 shows an exemplary game screen image for changing the position of the tee shot. In FIG. 9, after the player's character 142 is picked up, if the player shifts the finger and the thumb upwards while holding the touch panel 69 and the rear touch panel 70 between the finger and the thumb, the tee position control unit 48 displays an appearance of the player's character 142 who is lifted upwards along with the movement of the finger and the thumb. In this process, the tee position control unit 48 may display an appearance of the player's character moving as if floundering around.

Figure 11:
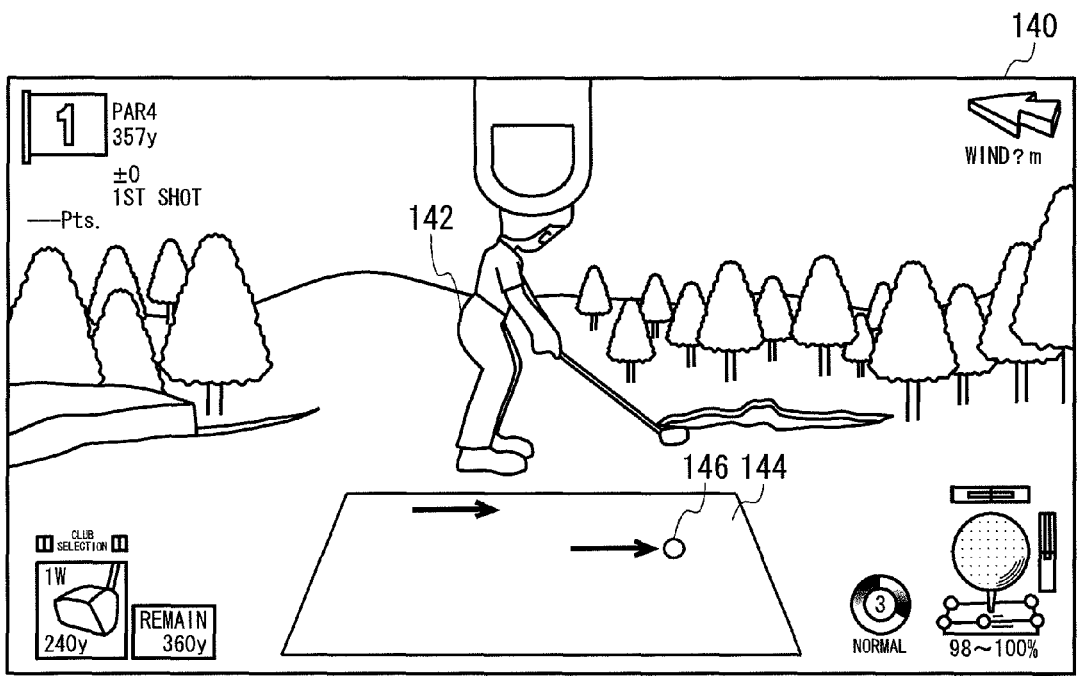
FIG. 11 shows an exemplary game screen image for changing the position of the tee shot.

FIG. 11 shows an exemplary game screen image for changing the position of the tee shot. In FIG. 10, after the player's character 142 is picked up, if the player shifts the finger and the thumb leftward or rightward while holding the touch panel 69 and the rear touch panel 70 between the finger and the thumb, the tee position control unit 48 moves, along with the movement of the finger and the thumb, the player's character 142 leftward or rightward within a range where the tee-up position stays within the tee up area 144. After this, if the player takes off the finger and the thumb, the tee position control unit 48 displays an appearance of the player's character getting down on the earth, and moves the ball 146 along with the movement of the player's character 142. This allows a player to move the tee-up position in a novel manner where the player pinches the player's character 142 and moves the character 142.

As shown in FIGS. 8-11, the ground in the game space displayed on a game screen image is substantially perpendicular to the plane of the touch panel 69 and the rear touch panel 70. That is, the ground in the game space extends in the direction of the depth, which is perpendicular to the screen of the display device 68. Therefore, the upward or downward direction in the game space corresponds to the upward or downward direction on the display device 68, the touch panel 69, and the rear touch panel 70. Therefore, if a player holds the position of a character between a finger and a thumb, the character displayed on the display device 68 is moved in the direction of leaving the ground. If the player moves the finger and the thumb, the character is moved upward, downward, leftward, or rightward along with the movement of the finger and the thumb of the player. If the player detaches the finger and the thumb, the character gets down on the ground. Thereby, the character can be shown as if the player actually pinches the character in the game device 10, which can provide a novel representation.

The power determination unit 44 determines the power of the shot taken by a player's character. Upon receiving from the input device 20 an input operation to which an instruction for starting a shot is assigned, the power determination unit 44 allows the screen image generating unit 66 to generate an screen image where the player's character is swinging back in order to hit a ball, and allows the display device 68 to display the image. The player inputs through the input device 20 an operation to which an instruction for determining the power by referring as an indicator the progression degree of the backswing motion of the player's character is assigned. The power determination unit 44 determines the power of a shot in accordance with the progression degree of a shot motion of the player's character at a time point when the input operation for determining the power is received. The power determination unit 44 notifies the ballistic trajectory calculation unit 50 of the determined power.

The power determination unit 44 determines the power of a shot on the basis of the ratio between a time period required for the backswing motion when making a full swing and a time period after backswing is started and before the input operation for determining the power is received, or the ratio between the number of frames of screen images to be displayed thereof. The power at a time point when an input operation is received may be determined by interpolation, for example, while assuming the power at a time point when the backswing is started as 0 percent and assuming the power at a time point when the swing is at the top as 100 percent. In case that a time period required for a full swing is 2 seconds and if an input operation is received 1.6 second after the start of the backswing, the power may be defined as 80 percent. In case that the number of frames required for displaying a full swing is one hundred and if an input operation is received seventy frames after the start of the backswing, the power may be defined as 70 percent. When the power reaches a predetermined value, e.g., 50 percent and/or 100 percent, the power determination unit 44 may display thereof or may change the display mode of a club head as an indicator for a user to time.

Figure 12A:
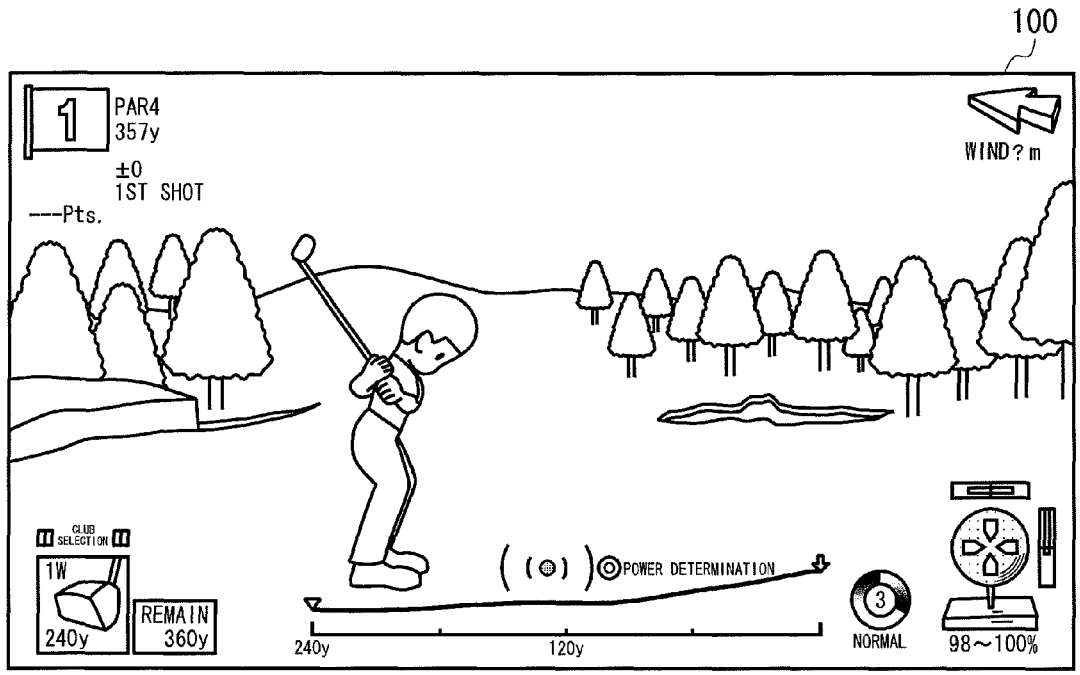
FIGS. 12A and 12B show an exemplary game screen image where a player's character is swinging back.
Figure 12B:
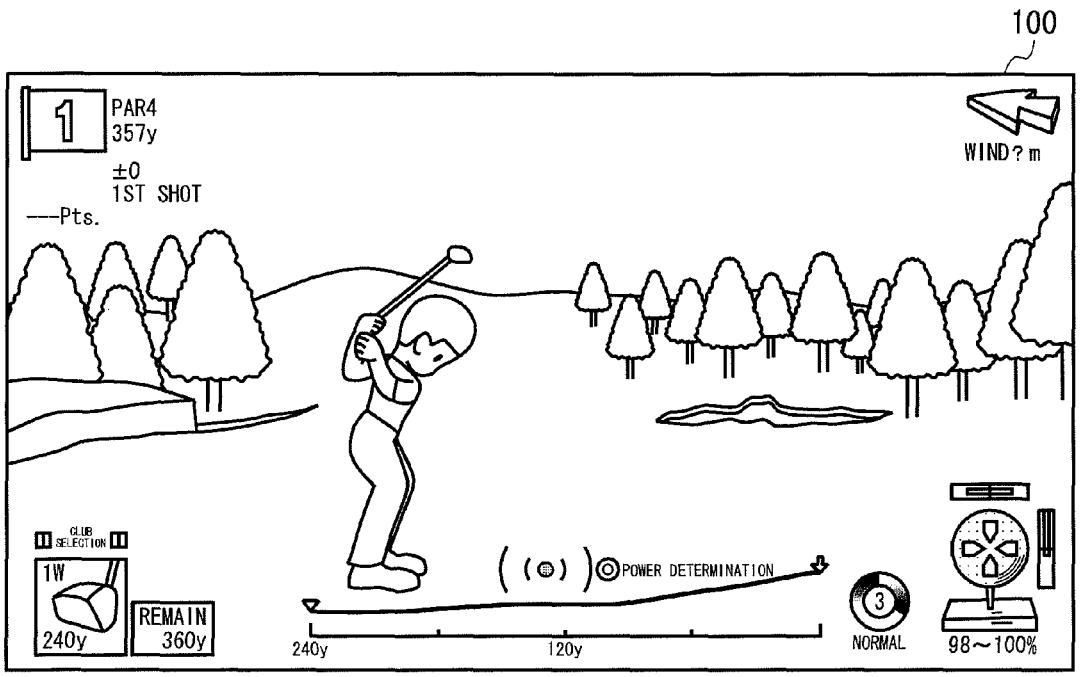

FIGS. 12A and 12B show an exemplary game screen image where a player's character is swinging back. FIG. 12A shows a status where a half of the time period that is required for a full swing has been passed after the player's character started swinging back. Upon receiving an operation input by a player at this time point, the power determination unit 44 determines the power of the shot as 50 percent. FIG. 12B shows a status where the player's character is at the top of the swing. Upon receiving an operation input by the player at this time point, the power determination unit 44 determines the power of the shot as 100 percent.

In case of receiving an input operation during the backswing, the power determination unit 44 may stop the backswing and shift to downswing, or may allow the character to continue the backswing and may display an appearance of the character swinging fully. In case that an input operation has not been received during the backswing and the motion of the character has reached the top of the swing, the power determination unit 44 may determine that the swing is a practice swing so that the shot is not to be taken. Alternatively, the power determination unit 44 may define that the power gradually decreases during the downswing, may continue receiving an input operation, and may determine the power in accordance with the time period after the start of the downswing and before the reception of an input operation.

The power determination unit 44 may define that a full swing does not always produce the power of 100 percent depending on the lie condition, the land features of a bunker when hitting a bunker shot, the stance of a player's character, or the like. The power determination unit 44 may not allow the player's character to make a full swing but allow the character to make only a half swing in case of an approach shot, etc. Even in such a case, by providing a function that allows a player's character to make a practice swing as described above, a player can first allow the player's character to make a practice swing so as to check the relationship between a swing and the power thereof, and can take a shot accordingly.

The impact determination unit 45 determines the impact of a shot taken by a player's character. After the power of a shot is determined by the power determination unit 44, the impact determination unit 45 allows the screen image generating unit 66 to generate a screen image wherein the player's character is down-swinging and allows the display device 68 to display the image, accordingly. The player inputs through the input device 20 an operation, to which an instruction for determining the impact is assigned, by timing the input to the strike of a ball following to the downswing made by the player's character. The impact determination unit 45 determines the impact of a shot in accordance with the time difference between a time point when the player's character hits a ball after a downswing and a time point when the input operation for determining the impact is received. The impact determination unit 45 notifies the ballistic trajectory calculation unit 50 of the determined impact. In this process, whether the input operation is received earlier or the later than a time point when the impact reaches 100 percent may be represented by adding a negative sign in case that the input operation is received earlier and by adding a positive sign in case that the input operation is received later.

As assistance of an indicator for timing, the impact determination unit 45 allows the screen image generating unit 66 to generate a screen image including a graphic symbol that shrinks as time passes and reaches its minimum size when the player's character strikes a ball (i.e, when a shot can be taken with the highest impact) and allows the display device 68 to display the image, accordingly. The player can input an operation for determining the impact by further referring to the shrinking graphic symbol as an indicator. The impact determination unit 45 may display a graphic symbol having the center or the center of gravity thereof at the position of a ball and may allow the graphic symbol to shrink so as to contract toward the position of the ball. This enables implementation of a more user-friendly user interface since a player can operate while visually checking both of the appearance of a downswing of a player's character and the appearance of a shrinking graphic symbol.

The impact determination unit 45 may determine the impact at a time point when an input operation is received by interpolation, for example, while assuming the impact at a time point when the player's character hits a ball (i.e, when there is no time difference) as 100 percent, and assuming the impact at a time point when the time difference reaches a predetermined upper limit value as a predetermined lower limit. As will be described later, a correction is made on the shot distance, the direction, or the like, in the ballistic trajectory calculation unit 50 so that the lower the value of the impact determined by the impact determination unit 45 is, the farther the ball departs from the targeted landing point. In case the time difference exceeds the predetermined upper limit without receiving an input operation after the downswing by the player's character passes a ball, the impact determination unit 45 may determine that the swing is a practice swing so that the shot is not to be taken. Alternatively, the impact determination unit 45 may allow the player's character to take a shot by automatically defining the impact as the predetermined lower limit.

Figure 13A:
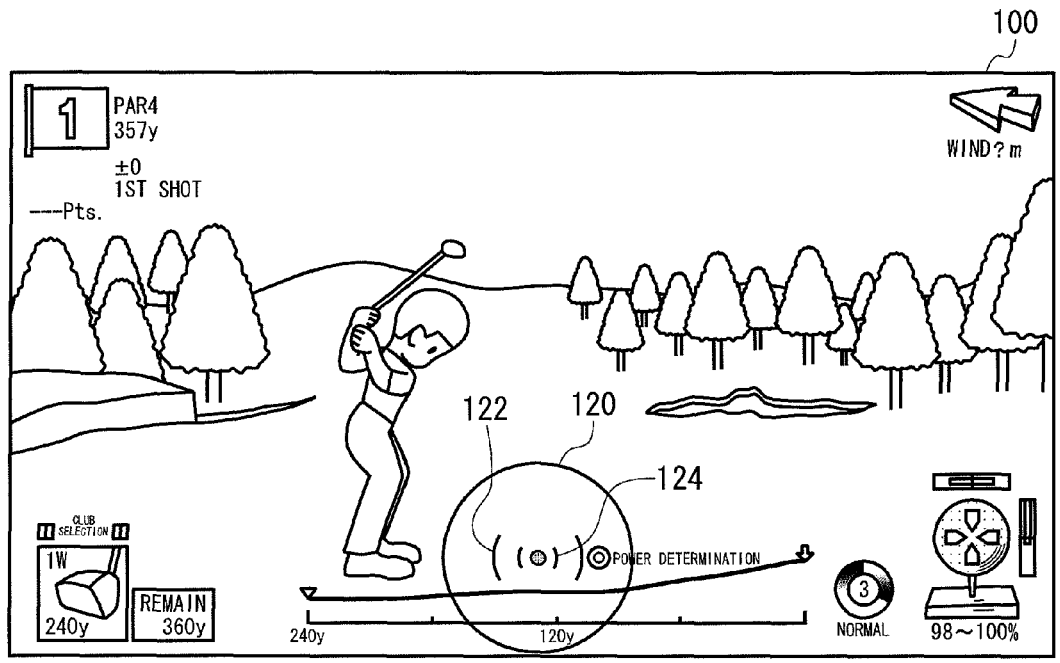
FIGS. 13A and 13B show an exemplary game screen image where the player's character is swinging down.
Figure 13B:
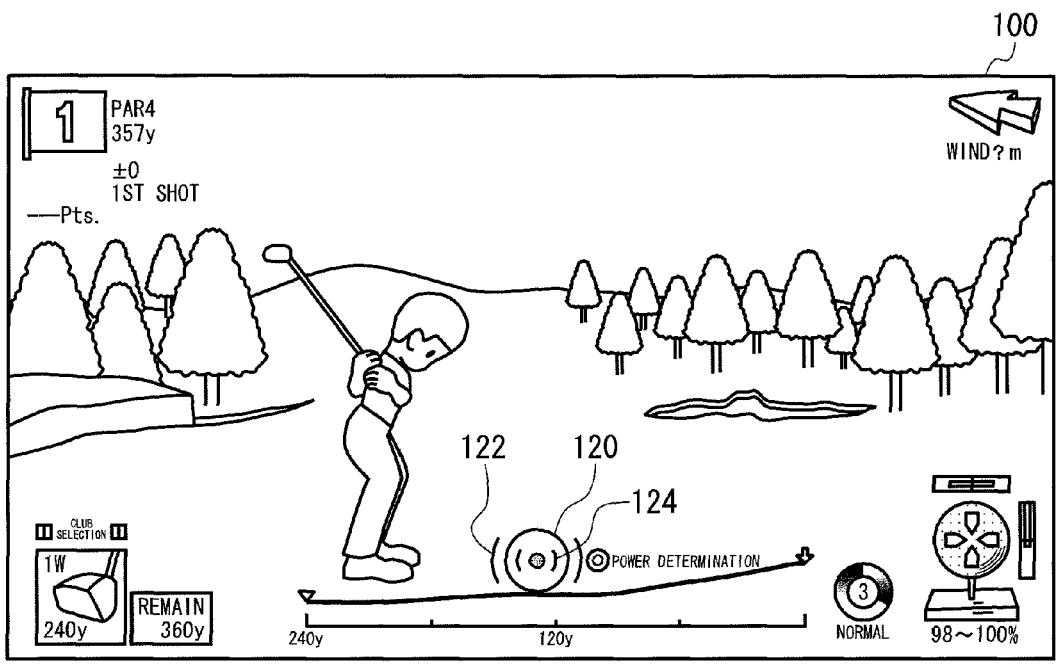

FIGS. 13A and 13B show an exemplary game screen image where the player's character is swinging down. FIG. 13A shows a status when the player's character starts the downswing. The impact determination unit 45 displays a circle 120 as assistance of an indicator for timing. The impact determination unit 45 further displays a graphic symbol 122 indicating the diameter of the circle 120 when the impact reaches the lower limit thereof and a graphic symbol 124 indicating the diameter of the circle 120 when the impact reaches the upper limit thereof, for example, 100 percent. When an input operation is received while the diameter of the circle 120 is larger than the diameter shown by the graphic symbol 122, the impact determination unit 45 may define the impact as the predetermined lower limit value. In this case, the ballistic trajectory calculation unit 50 may define the shot as a miss shot, as will be described later. In case that an input operation is received while the diameter of the circle 120 is smaller than the diameter shown by the graphic symbol 124, the impact determination unit 45 may define the impact as the predetermined upper limit, for example, 100 percent. In case that an input operation is received while the diameter of the circle 120 is smaller than the diameter shown by the graphic symbol 122 and larger than the diameter shown by the graphic symbol 124, the impact determination unit 45 may define a value between the predetermined upper limit value and the predetermined lower limit value in accordance with the time point when the input operation is received. FIG. 13B shows a status right before the player's character strikes a ball. The impact determination unit 45 shrinks the circle 120 so that the circle 120 reaches its minimum size at the moment when the player's character strikes the ball. In case that no input operation has been received by the moment when the player's character strikes the ball, the impact determination unit 45 may expand the circle 120 thereafter. In this case, the impact may be defined as the upper limit value while the diameter of the circle 120 is smaller than the diameter shown by the graphic symbol 124 and the impact may be defined as the lower limit value when the diameter of the circle 120 is larger than the diameter shown by the graphic symbol 122. In case that no input operation is received even at the moment when the diameter of the circle 120 becomes larger than the diameter shown by the graphic symbol 122, the impact may be automatically defined as the lower limit value when allowing the player's character to take a shot. As another example, the impact determination unit 45 may define the impact as the lower limit value when the diameter of the circle 120 is larger than the diameter shown by the graphic symbol 122 and may define the impact as the upper limit value when the diameter of the circle 120 is the same as the diameter shown by the graphic symbol 124 while ensuring that the impact becomes larger as the diameter of the circle 120 becomes smaller. Thereafter, the impact may be defined so as to become smaller gradually as the diameter of the circle 120 becomes smaller than the diameter shown by the graphic symbol 124.

As yet another example, the impact determination unit 45 may display both: a) a graphic symbol that moves leftward and rightward or upwards and downwards, or along an arbitrary straight line or curved line as time passes; and b) a gauge that indicates the position of a graphic symbol for the maximum impact, as an indicator for a player to time an operation to input to the strike. Alternatively, the impact determination unit 45 may determine the impact or the power of a shot in accordance with the angle, velocity, pressure, etc., of the tilting of the analog stick of the input device 20.

The ballistic trajectory calculation unit 50 calculates the ballistic trajectory of a shot by a physical calculation based on the power and the impact of a shot determined by the shot control unit 41 and based on the external factors such as the lie of a ball, a wind, land features, or the like.

The ballistic trajectory calculation unit 50 reads out from the parameter retaining unit 60 the initial velocity and the loft angle that are predetermined in advance in accordance with a club used to take a shot. Based on the read out velocity and loft angle, the ballistic trajectory calculation unit 50 adjusts the initial velocity or the loft angle in accordance with the power determined by the power determination unit 44, the impact determined by the impact determination unit 45, an attribute value such as physical strength defined for each player's character, the lie of a ball, etc. For example, the ballistic trajectory calculation unit 50 may multiply the initial velocity by the percentage value of the power or the impact so that the higher the power or the impact is, the faster the initial velocity is. The ballistic trajectory calculation unit 50 may adjust the direction, the velocity, or the like of a flying ball so that the smaller the value of the impact is, the farther the ball departs from the targeted landing point. For example, in case that an input operation is received earlier than the moment when the impact reaches 100 percent, the trajectory of the ball may be bent rightward so as to produce a slice, and in case that an input operation is received later, the trajectory may be bent leftward so as to produce a hook. In case that the impact is below the predetermined lower limit, the shot may be determined to be missed, and the trajectory may be calculated with an extremely reduced initial velocity. In case of a shot from the rough or a bunker, the initial velocity may be reduced compared to a shot from the fairway. The initial velocity may be reduced if the inclination of the ground under the ball is large. In case that the player inputs an operation to change the initial velocity and/or the loft angle when taking a shot, the initial velocity and/or the loft angle may be adjusted further in consideration of the effects thereof.

Upon determining the initial velocity and the loft angle, the ballistic trajectory calculation unit 50 calculates the position of the ball for each frame while adjusting the velocity in accordance with a force applied to the ball. The ballistic trajectory calculation unit 50 adds a velocity per frame to the coordinates of the current ball position and calculates the coordinates of the ball position in the subsequent frame, accordingly. Gravity, aerodynamic lift force, wind force, and air resistance are added to the velocity of the ball for each frame. The gravitational force is assumed as 9.8 meters/second$^2$ in the downward direction in accordance with the laws of physics. The aerodynamic lift force is set to be a value that is proportional to the velocity in the upward direction. The wind force may be defined by assuming a constant velocity in a certain direction everywhere in the golf course or may be changed depending on the location in the golf course. The air resistance is defined as a value that is proportional to the velocity in the direction opposite to the traveling direction. In this manner, by calculating the ballistic trajectory of a ball while considering the direction and the velocity of a wind, the difficulty of taking a shot while considering the effects of wind can be presented in a similar manner as that of the actual golfing, and a golf game that is more realistic can be realized.

In case that a ball hits something, the velocity in the horizontal direction and in the vertical direction are adjusted in accordance with a friction coefficient and a restitution coefficient defined in advance in accordance with the attributes of the surface that the ball hits. The friction coefficient and the restitution coefficient may be set as values varying depending on areas, such as, fairway, rough, bunker, etc. The ballistic trajectory calculation unit 50 may further provide the trajectory with a specific computation, which has no relationship with the laws of physics, as a rendering effect. This adds variety to the golf game and thus enhances the entertainment experience of the game.

The screen image generating unit 66 defines the viewpoint position and the line of sight of the camera in accordance with the position of the ball calculated by the ballistic trajectory calculation unit 50 so that the ball is displayed in a screen image, generates a screen image showing an appearance of a flying ball, and displays the image on the display device 68, accordingly. If the ball comes to rest, the scene is switched to a next shot.

In case that a power shot, which can produce a shot distance beyond the ability of the player's character, is selected, the power shot control unit 51 measures success or failure of the power shot. In case that a power shot is selected, the range of time period enabling the maximum impact is defined as a shorter period in comparison with that of a normal shot. Upon receiving an input instruction to determine the impact within the time period that is set shorter than that of a normal shot, the power shot control unit 51 measures that the power shot has been taken successfully.

According to the exemplary embodiment, the power shot control unit 51 allows a character to take a full power shot, which can produce a further long shot distance in comparison with a normal power shot. The full power shot is measured as success if all of the conditions below are met. (1) A power shot is selected. (2) A second input instruction for determining the power is received at a favorable timing after a first input instruction for starting a swing is received. (3) A player turns the game device 10 as if pulling the upper side of the game device 10 toward the player by more than or equal to a predetermined angle after the second instruction is input. (4) A third input instruction for determining the impact is received at a favorable timing. (5) The player rotates the game device 10 as if pushing the upper side of the game device 10 away from the player by the third input instruction so that the orientation of the game device 10 is turned back at the time of the third input instruction to an orientation substantially same with the orientation at the time of the second input instruction. The power shot control unit 51 measures success or failure of a full power shot by measuring whether or not the above conditions are met.

The power shot control unit 51 acquires, from the tri-axial gyro sensor 75 or the tri-axial acceleration sensor 76, information relating to the orientation of the game device 10 at the time of the second input instruction for determining the power is received, calculates the pitch angle while defining that an axis is along the longitudinal direction of the game device 10, and stores the pitch angle as a reference angle in the parameter retaining unit 60. The power shot control unit 51 acquires an orientation of the game device 10 after the second input instruction is received, from the tri-axial gyro sensor 75 or the tri-axial acceleration sensor 76 in predetermined time intervals, calculates the pitch angle, and measures whether or not the game device 10 rotates by more than or equal to a predetermined first angle from the reference angle stored in the parameter retaining unit 60. If the game device 10 has never turned more than or equal to the first angle during a time period after the second input instruction is received and before the third input instruction for determining the impact is received, the power shot is measured as failure.

The power shot control unit 51 acquires, from the tri-axial gyro sensor 75 or the tri-axial acceleration sensor 76, information relating to the orientation of the game device 10 at the time when the third input instruction is received, calculates the pitch angle at the time point, and measures whether or not the pitch angle is within a predetermined second angle from the reference angle stored in the parameter retaining unit 60. The range of the second angle may be defined at the front side of the reference angle, or may be defined at the backside of the reference angle, or may be defined as ranging from the front side to the backside so as to include the reference angle. If the pitch angle when the third input instruction is received is not within the range of the second angle, the power shot is measured as failure.

After inputting the second instruction, the player turns the game device 10 as if pulling the upper side of the game device 10 toward the player by more than or equal to the first angle, further turns the game device 10 as if pushing the upper side of the game device 10 away from the player, and inputs the third instruction by timing the input to the impact. At the time point when the third instruction is input, if the orientation of the game device 10 has been turned back to an orientation substantially same with the orientation at the time of the second input instruction, the player can succeed in the full power shot. Upon measuring that the full power shot has been taken successfully, the power shot control unit 51 instructs the power determination unit 44 to increase the power of the shot by a predetermined value. The increment of the power may be determined in accordance with the difference between the pitch angle of the game device 10 when the third input instruction is received and the reference angle. For example, a value that increases as the difference between the pitch angle and the reference angle decreases may be added to the power.

Figure 14A:
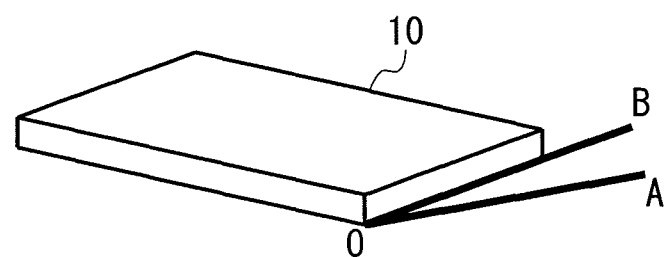
FIGS. 14A-14C are diagrams that illustrate requirements for taking a power shot successfully.
Figure 14B:
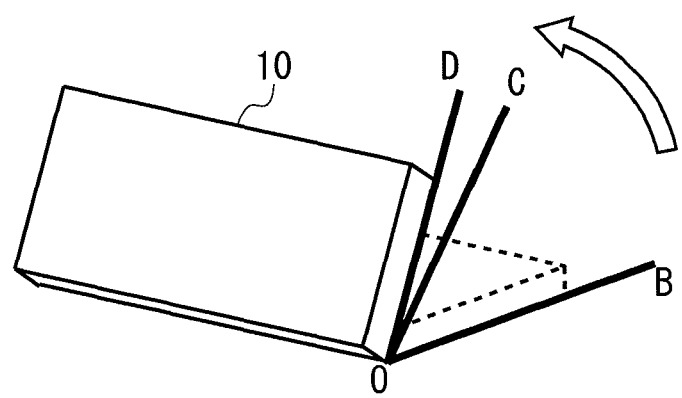
Figure 14C:
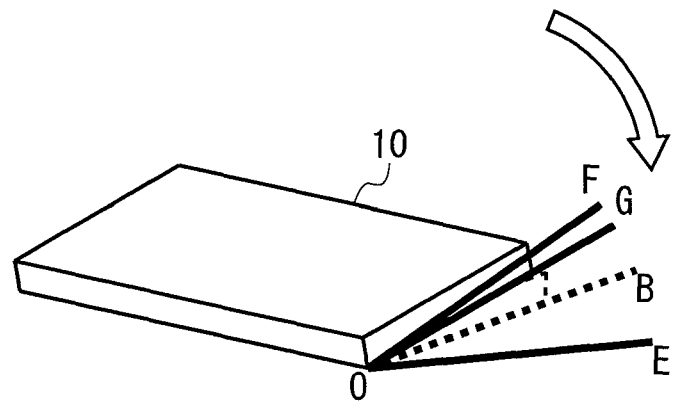

FIGS. 14A-14C are diagrams that illustrate requirements for taking a power shot successfully. It is assumed that the player inputs the second instruction in the status shown in FIG. 14A after inputting the first instruction for starting a shot. In this process, the power shot control unit 51 acquires the orientation of the game device 10 from the tri-axial gyro sensor 75 or the tri-axial acceleration sensor 76, calculates an angle AOB, which is defined by the horizontal direction AO and the upward/downward direction of the game device 10 BO, and stores the angle AOB as a reference angle in the parameter retaining unit 60. The power shot control unit 51 may perform a calibration so that the reference angle is set to 0 degree. In this case, the reference angle may not be stored in the parameter retaining unit 60. Hereinafter, an explanation will be given while assuming the calibration is made so that the reference angle is set to 0 degree.

In order to measure whether or not the above requirement (3) is met, the power shot control unit 51 acquires an orientation of the game device 10 after the second input instruction is received, from the tri-axial gyro sensor 75 or the tri-axial acceleration sensor 76 in predetermined time intervals, and measures whether or not the pitch angle BOD exceeds the first angle BOC as shown in FIG. 14B. If the angle BOD exceeds the angle BOC, the power shot control unit 51 measures that the requirement (3) is satisfied.

In order to measure whether or not the requirement (5) is met, the power shot control unit 51 acquires the orientation of the game device 10 at the time when the third input instruction is received, from the tri-axial gyro sensor 75 or the tri-axial acceleration sensor 76, and measures whether or not the pitch angle BOG is within the range of the second angle, that is, between the angle BOE and the angle BOF as shown in FIG. 14C. If the angle BOG is between the angle BOE and the angle BOF, the power shot control unit 51 measures that the requirement (5) is satisfied.

Although in the example described above, a player is required to manipulate the game device 10 by inputting via a button while rotating the game device 10 back and forth, in another example, a player may be required to input via a button while moving the game device 10 back and forth. The power shot control unit 51 may measure success or failure of a full power shot or may determine the increment of the power by not only using the pitch angle of the game device, but also using the roll angle or the yaw angle. Further, a ballistic trajectory may be changed by using the roll angle or the yaw angle. For example, in case that a player inputs the third instruction while giving a twist to the game device 10 leftward or rightward, a ballistic trajectory may be changed to leftward or rightward, accordingly.

In the example described above, the reference orientation is defined when the second instruction is input, and it is required to first rotate the game device forward by more than or equal to the first angle and then to turn the device back to the reference orientation by the time when the third instruction is input. However, a variety of modifications are possible with the timing or the type of manipulation. For example, the reference angle may be defined when the first instruction is input, and a requirement may be set that a player first rotates the game device forward and then turns the device back to the reference orientation by the time when the second or third instruction is input. Alternatively, the reference angle may be defined when the first instruction is input, and a requirement may be set that a player first pushes the game device away from the player by more than or equal to a predetermined angle, turns the game device back to the reference angle when the second instruction is input, then rotates the game device forward by more than or equal to a predetermined angle, and turns the game device back again to the reference angle when the third instruction is input. In case of taking a shot by two times input instructions, the reference angle may be defined when the first instruction is input, and a requirement may be set that a player first rotates the game device forward by more than or equal to a predetermined angle and then turns the device back to the reference orientation by the time when the second instruction is input. Instead of setting an orientation at the predetermined time point as a reference, the horizontal direction or the vertical direction in a real world may be set as a reference. Instead of an angle, a requirement may be set that an angular speed, a velocity, an acceleration, the amount of displacement, or the like are more than or equal to a predetermined value, or within a predetermined range.

The player shooting unit 52 controls the front camera 71 so as to capture an image of a player who is playing the golf game. The player shooting unit 52 captures an image of the player in case the player has succeeded in a wonderful super shot, such as, an ace, a chip-in, an albatross, an eagle, a birdie, an approach shot bringing a ball within a predetermined range from the pin, a shot with which a time point when an instruction for determining the power or the impact is input within a predetermined time period, etc. Whether or not the player has succeeded in the super shot can be measured by a ballistic trajectory calculated by the ballistic trajectory calculation unit 50 right after the player inputs the third instruction. Therefore, whether or not to capture an image can be determined while a ball flies in the air. Thus, the player shooting unit 52 may capture an image of the player at an instant when a ball drops into the cup, or at an instant when a ball stops near the pin. Alternatively, the player shooting unit 52 may capture a moving image of the player's face, starting from while the ball still flies in the air. After a player has succeeded in a super shot, the player shooting unit 52 may first display on a screen that a commemorative photograph will be taken and then capture an image of the player's face.

The player shooting unit 52 may process the captured photograph of a player and may display the photograph, accordingly. For example, the player shooting unit 52 may overlap an image of a crown on the head of the player or may overlap an image of a medal on the chest of the player by using face recognition technology, or the like. Since the front camera 71 is provided on the right upper position on the game device 10, and the player's face is placed in the right side of a captured image, the left side of the image may be cropped so that the player's face is placed at the center. The player shooting unit 52 may associate the captured player's still image or moving image and replay data stored in the parameter retaining unit 60 by a replay control unit (not shown) and may store the image and the data in a recording medium or the like, accordingly. The player shooting unit 52 may allow the image to be attached to a mail or the like to be sent to another player, or may allow the image to be uploaded to a server so that another player can view the image.

The player shooting unit 52 may capture an image of the player when the player has missed a shot, such that a ball lands in an OB area, a water hazard, a bunker, a rough, or the like. In this case, the player shooting unit 52 may overlap an image of sweat or tears on the captured photograph of the player and may display or store the photograph, accordingly.

The background control unit 53 controls the background of a game screen image. Upon receiving a touch input in the upper half region of the rear touch panel 70, the background control unit 53 switches the background image of a game screen image to an image captured by the rear camera 72. Normally, sky is displayed in a region where no object exists in a game screen image where geographic features of a golf course are rendered. This region is switched to an image around a player in a real world. The background control unit 53 may switch the background of a game screen image to an image stored in the game data retaining unit 62 or the like. For example, the game screen image may be switched to an image of a real and famous golf course, or to a scenery image, etc. This allows a player to enjoy the feeling as if playing golf in a real world.

Figure 15:
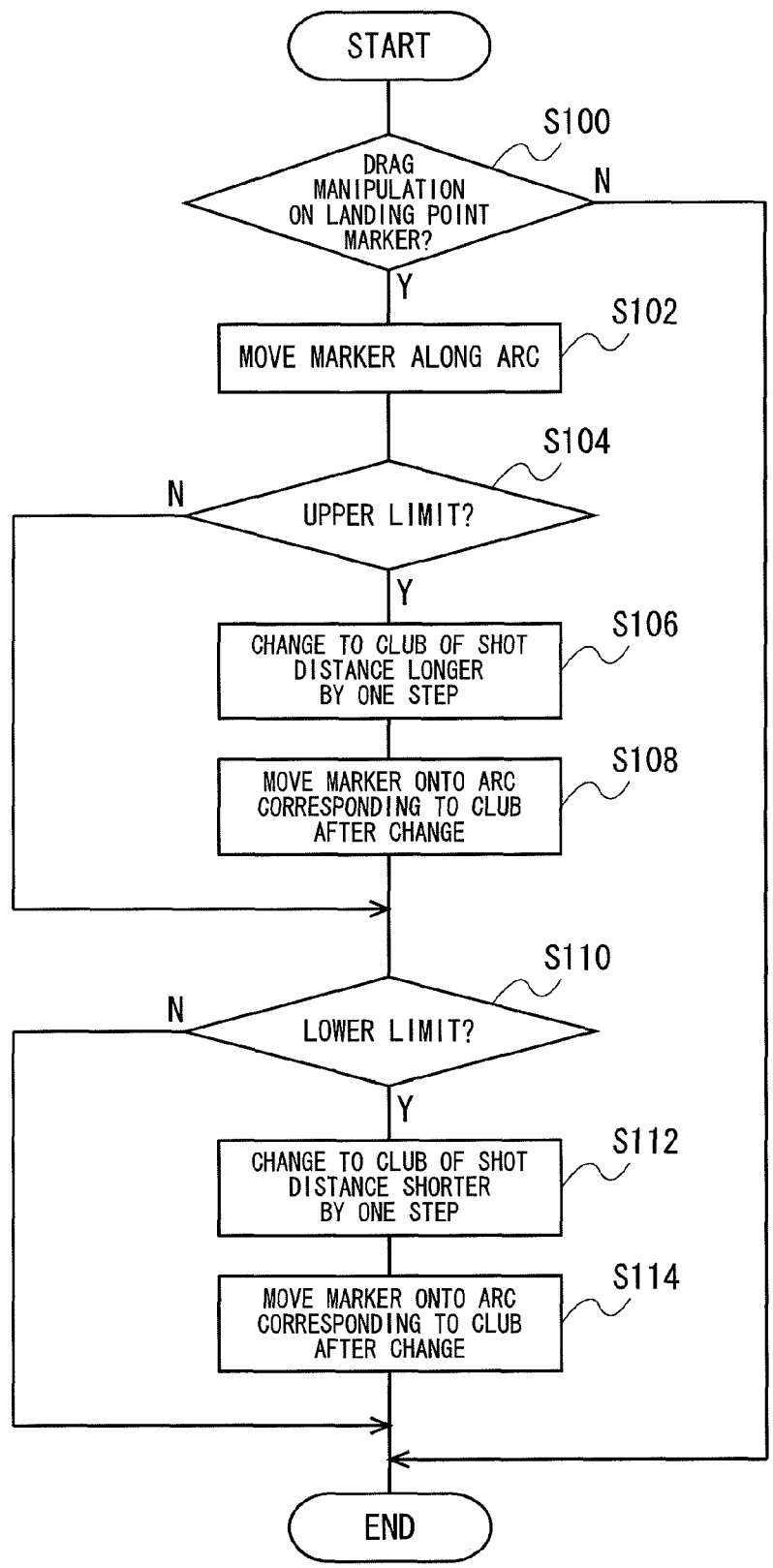
FIG. 15 shows a flowchart indicating a process for moving a marker indicating a predicted landing point of a ball.

FIG. 15 shows a flowchart indicating a process for moving the position of a marker indicating a predicted landing point of a ball. On a landing site screen image for showing an area near a predicted landing point of a ball, if a player drags a marker by a finger or a thumb (Y in S100), the landing point control unit 47 acquires the position of the finger or the thumb as an indicated position, and moves the marker along an arc of which the radius represents a shot distance expected in case that a player's character takes a shot by using a currently selected club (S102). In case that the distance between the current ball position and the indicated position exceeds an upper limit of an range for maintaining the current club selection (Y in S104), the landing point control unit 47 changes the selected club to a club of a shot distance longer by one step (S106), and moves the marker onto an arc corresponding to the club after change (S108). In case that the distance does not exceed the upper limit (N in S104), the steps S106 and S108 will be skipped. In case that the distance between the current ball position and the indicated position falls short of an lower limit of an range for maintaining the current club selection (Y in S110), the landing point control unit 47 changes the selected club to a club of a shot distance shorter by one step (S112), and moves the marker onto an arc corresponding to the club after change (S114). In case that the distance does not fall short of the lower limit (N in S110), the steps S112 and S114 will be skipped. In case of not receiving a drag manipulation on the marker (N in S100), the steps S102 through S114 will be skipped. These steps are repeated while the landing site screen image is displayed.

Figure 16:
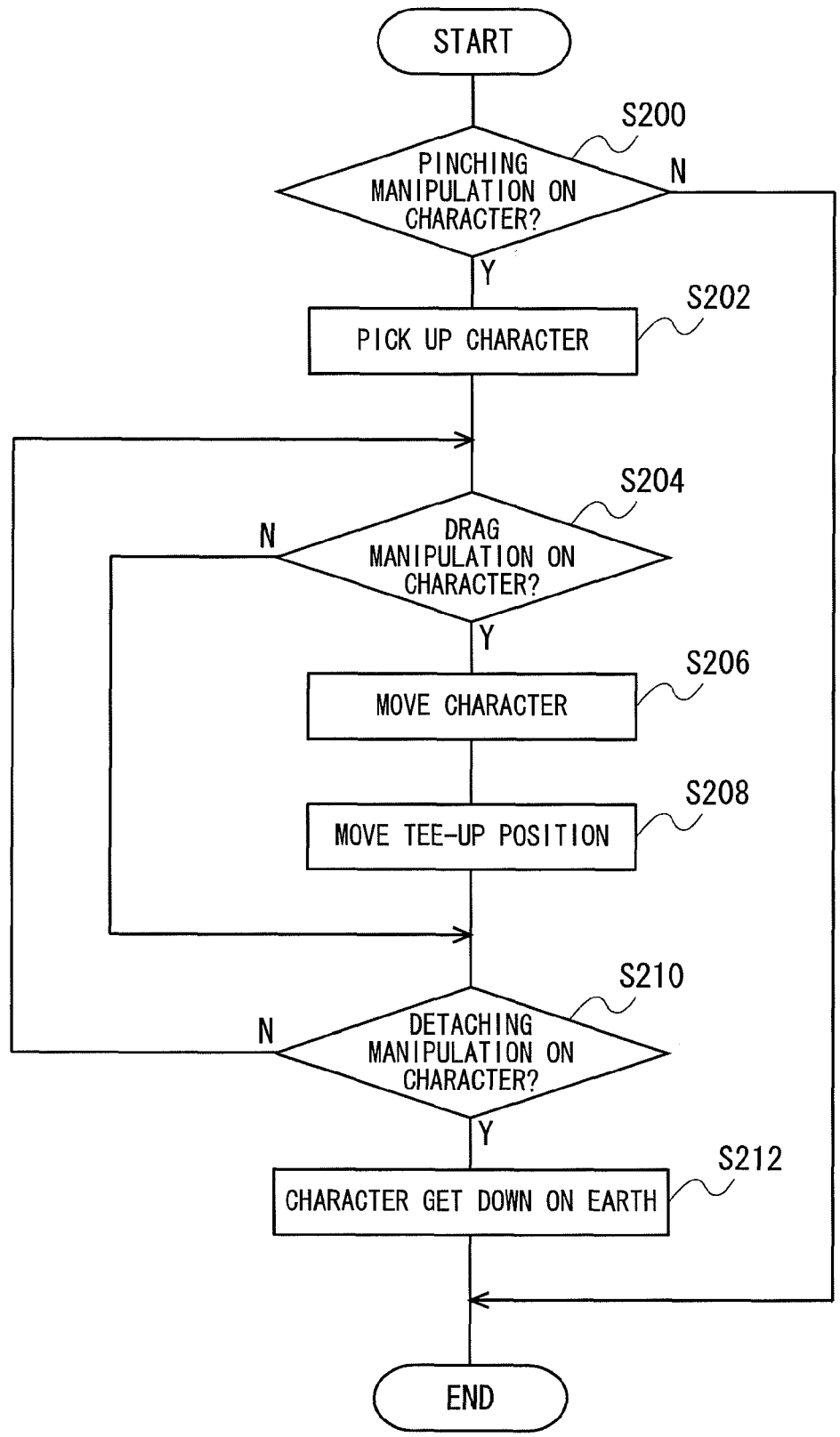
FIG. 16 shows a flowchart indicating a process for moving a tee-up position.

FIG. 16 shows a flowchart indicating a process for moving the tee-up position. In the teeing ground screen image for showing an area near the teeing ground, if a player manipulates the touch screens as if pinching a player's character (Y in S200), the tee position control unit 48 displays an appearance of the player's character who is picked up (S202). If the player makes a drag manipulation while keeping pinching the player's character with his/her finger and thumb (Y in S204), the tee position control unit 48 moves the player's character to an indicated position (S206), and moves the tee-up position along with the move of the player's character (S208). In case of not receiving a drag manipulation (N in S204), the steps S206 and S208 will be skipped. The steps S204 through S208 are repeated until the player takes off the finger and the thumb, that have been pinching the player's character, from the touch screens (N in S210). If the player takes off the finger and the thumb from the touch panels (Y in S210), the tee position control unit 48 displays an appearance that the player's character having been held up gets down on the earth (S212). In case of not receiving a pinching manipulation on the character (N in S200), the steps S202 through S212 will be skipped. These steps are repeated while the teeing ground screen image is displayed.

Figure 17:
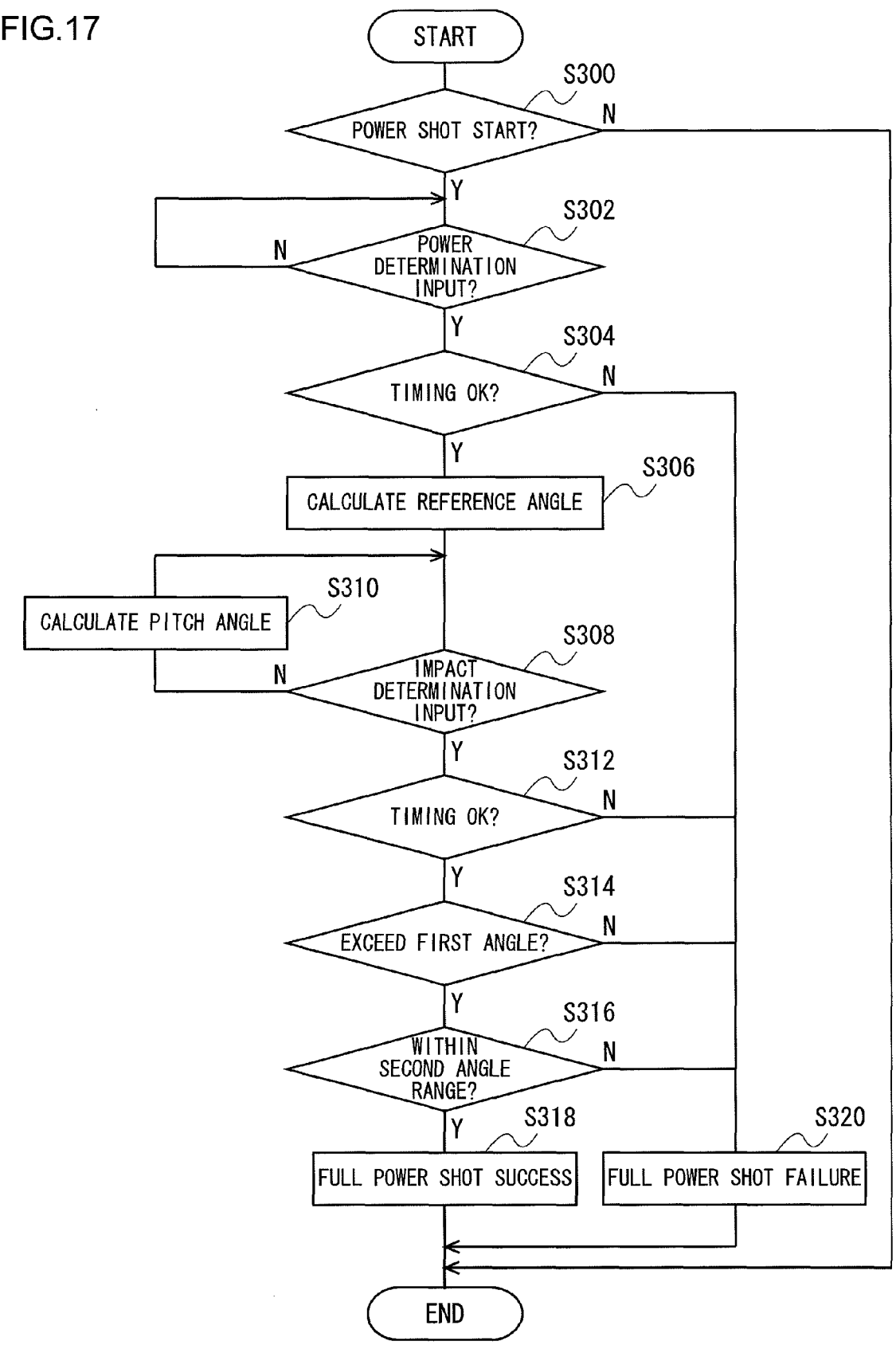
FIG. 17 shows a flowchart indicating a process for measuring success or failure of a full power shot.

FIG. 17 shows a flowchart indicating a process for measuring success or failure of a full power shot. If a first input instruction for starting a shot is received in a state where a power shot is selected (Y in S300), the state is awaited until a second input instruction for determining the power is received (N in S302). In case a second input instruction is received (Y in S302), if a time point when the instruction is input is within a predetermined range (Y in S304), information indicating the attitude of the game device 10 at that time is acquired from the tri-axial gyro sensor 75 or from the tri-axial acceleration sensor 76, and a pitch angle is calculated and is defined as a reference angle (S306). If a time point when the instruction is input is out of the predetermined range (N in S304), the full power shot is measured as failure (S320), and the process is completed. Next, until a third input instruction for determining the impact is received (N in S308), information indicating the attitude of the game device 10 is acquired at a certain timing from the tri-axial gyro sensor 75 or the tri-axial acceleration sensor 76, and a pitch angle is calculated (S310). If the third input instruction is received (Y in S308), in case that a time point when the instruction is input is within a predetermined range (Y in S312), it is measured whether the pitch angle of the game device 10 between the input of the second instruction and the input of the third instruction exceeds the first angle (S314). If the pitch angle exceeds the first angle (Y in S314), it is further measured whether the pitch angle of the game device 10 when the third input instruction is received is within the range of the second angle (S316). If the pitch angle is within the range of the second angle (Y in S316), the full power shot is measured as success (S318), and the process is completed. If a time point when the third instruction is input is out of the predetermined range (N in S312), or if the pitch angle of the game device 10 between the input of the second instruction and the input of the third instruction does not exceed the first angle (N in S314), or if the pitch angle of the game device 10 when the third input instruction is received is out of the range of the second angle (N in S316), the full power shot is measured as failure (S320), and the process is completed. In case of not receiving a first input instruction (N in S300), the steps S302 through S320 will be skipped, and the process is completed.

Given above is an explanation based on the exemplary embodiment. The exemplary embodiment is intended to be illustrative only and it will be obvious to those skilled in the art that various modifications to constituting elements and processes could be developed and that such modifications are also within the scope of the present invention.

According to the exemplary embodiment, an explanation has been given on a technology wherein, if a player pinches the touch panel and the rear touch panel at the positions where a player's character is displayed, the player's character can be picked up and moved. There may be a variety of examples to which a technology that detects a manipulation of pinching the touch panel and the rear touch panel almost at the same positions and reflecting the detection on control is applied. For example, in case that upward drag manipulation is made before starting an approach shot concurrently on the touch panel and the rear touch panel at the position where a pin is displayed, i.e., in case that a player makes a motion as if pinching the pin and moving the pin upward, control for pulling out the pin may be made. The technology may also be applied in a manner that a player can pinch an object or the like displayed in a screen image and can move the object upward, downward, leftward, or rightward.

Further inventive features of the present embodiments are defined in the following paragraphs:

1. A game control program embedded on a non-transitory computer-readable recording medium, allowing a computer to perform a method comprising:

acquiring the orientation of an input device, which receives an instruction input by a player and which is held by the player, from a sensor for detecting the orientation of the input device;

reading out data of a golf course from a storage device, generating an image of the golf course, and displaying the image on a display device;

determining the power or the impact of a shot taken by a player's character controlled by the player, in accordance with the timing of an instruction that is input by the player and is received through the input device;

calculating the ballistic trajectory of a ball shot by the player's character in accordance with the power or the impact determined; and measuring success or failure of the shot and in case the shot is measured as success, determining the power or the impact higher than that of a shot that is measured as failure, wherein the measuring includes:

executing a first measurement so as to acquire the orientation of the input device from the sensor at a predetermined time point after a shot by the player's character is started, as to define the orientation at the predetermined time point as a reference orientation, as to acquire an orientation of the input device from the sensor after that, and as to measure whether or not the input device rotates more than or equal to a predetermined first angle from the reference orientation around a predetermined axis;

executing a second measurement so as to acquire the orientation of the input device from the sensor at a time point when receiving the input instruction, as to compare the orientation of the input device at that time point with the reference orientation, and as to measure whether or not the orientation of the input device at that time point is within a predetermined second angle from the reference orientation around the predetermined axis; and measuring that the shot succeeds if both of the first measurement result and the second measurement result are positive.

2. The game control program according to paragraph 1, wherein the determining includes:

determining the power of the shot in accordance with a time point when a second instruction is input by the player after the shot of the player's character is started by a first instruction input by the player; and determining the impact of the shot in accordance with a time point when a third instruction is input by the player, wherein the measuring defines the orientation of the input device at the time point when the second instruction is input as the reference orientation, compares the orientation of the input device at the time point when the third instruction is input with the reference orientation, so as to execute the second measurement.

3. The game control program according to paragraph 1 or 2, wherein the predetermine axis is along the longitudinal direction of the input device or the leftward or rightward direction when the player holds the input device.

4. A game device comprising:

a sensor operative to detect the orientation of an input device held by the player, the input device receiving an instruction input by a player;

a screen image generating unit operative to read out data of a golf course from a storage device, operative to generate an image of the golf course, and operative to display the image on a display device;

a determination unit operative to determine the power or the impact of a shot taken by a player's character controlled by the player, in accordance with a time point when an instruction from the player input through the input device is received;

a ballistic trajectory calculation unit operative to calculate the ballistic trajectory of a ball shot by the player's character in accordance with the power or the impact determined by the determination unit; and a measurement unit operative to measure success or failure of the shot and in case the shot is measured as success, operative to allow the determination unit to determine the power or the impact higher than that of a shot that is measured as failure, wherein the measurement unit:

executes a first measurement so as to acquire the orientation of the input device from the sensor at a predetermined time point after a shot by the player's character is started, as to define the orientation at the predetermined time point as a reference orientation, as to acquire an orientation of the input device from the sensor after that, and as to measure whether or not the input device rotates more than or equal to a predetermined first angle from the reference orientation around a predetermined axis;

further executes a second measurement so as to acquire the orientation of the input device from the sensor at a time point when the determining unit receives an input instruction, as to compare the orientation of the input device at that time point with the reference orientation, and as to measure whether or not the orientation of the input device at that time point is within a predetermined second angle from the reference orientation around the predetermined axis; and measures that the shot succeeds if both of the first measurement result and the second measurement result are positive.

5. A method for controlling a game comprising:

acquiring the orientation of an input device, which receives an instruction input by a player and which is held by the player, from a sensor for detecting the orientation of the input device;

reading out data of a golf course from a storage device, generating an image of the golf course, and displaying the image on a display device;

determining the power or the impact of a shot taken by a player's character controlled by the player, in accordance with a time point when an instruction from the player input through the input device is received;

calculating the ballistic trajectory of a ball shot by the player's character in accordance with the power or the impact determined; and measuring success or failure of the shot and in case the shot is measured as success, allowing the determination unit to determine the power or the impact higher than that of a shot that is measured as failure, wherein the measuring includes:

executing a first measurement so as to acquire the orientation of the input device from the sensor at a predetermined time point after a shot by the player's character is started, as to define the orientation at the predetermined time point as a reference orientation, as to acquire an orientation of the input device from the sensor after that, and as to measure whether or not the input device rotates more than or equal to a predetermined first angle from the reference orientation around a predetermined axis;

executing a second measurement so as to acquire the orientation of the input device from the sensor at a time point when receiving the input instruction, as to compare the orientation of the input device at that time point with the reference orientation, and as to measure whether or not the orientation of the input device at that time point is within a predetermined second angle from the reference orientation around the predetermined axis; and measuring that the shot succeeds if both of the first measurement result and the second measurement result are positive.

What is claimed is:

1. A game control program embedded on a non-transitory computer-readable recording medium, allowing a computer to function as:
    a screen image generating unit operative to read out data of a golf course from a storage device, operative to generate an image of the golf course, and operative to display the image on a display device;
    a club selection unit operative to allow a player to select a club that a player's character controlled by the player uses for taking a shot in response to an input of a button provided on an input device;
    a landing point control unit operative to display a marker in the image of the golf course generated by the screen image generating unit, the marker indicating a predicted landing point of a ball when the player's character takes a shot by using the club selected by the club selection unit; and
    a shot control unit operative to control a shot taken by the player's character, wherein
    a position of the marker is represented by a two-dimensional polar coordinate system of which an origin point is a current ball position, and
    upon receiving an instruction for moving the position of the marker, the instruction having been input through a touch panel provided with the display device from a player,
    in case a distance between the current ball position and an indicated position indicated by the instruction falls within a predetermined range, the landing point control unit moves the marker to a position of an intersection of a first arc and a line connecting the current ball position and the indicated position, wherein a radius of the first arc represents a distance of a shot predicted in case that the player's character takes a shot by using the club currently selected by the club selection unit, and the landing point control unit changes a direction of a shot to be taken by the player's character, the shot being controlled by the shot control unit, to a direction of a line connecting the current ball position and a position of the marker after the move, and
    in case that the distance between the current ball position and the indicated position falls out of the predetermined range, the landing point control unit allows the club selection unit to select a different club and moves the marker to a position of an intersection of a second arc and a line connecting the current ball position and the indicated position, wherein a radius of the second arc represents a distance of a shot predicted in case that the player's character takes a shot by using a newly selected club,
    wherein, as the player uses the input device to select the club, the club selection unit moves the marker to an arc that corresponds to a shot distance of the club.

2. The game control program according to claim 1, wherein
    in case the indicated position is moved in a direction approaching to the current ball position so that the distance between the current ball position and the indicated position falls out of the predetermined range, the club selection unit newly selects, from a plurality of clubs of different shot distances, a club of which the shot distance is shorter by one step than that of the currently selected club, and
    in case that the indicated position is moved in a direction receding from the current ball position so that the distance between the current ball position and the indicated position falls out of the predetermined range, the club selection unit newly selects, from the plurality of clubs of different shot distances, a club of which the shot distance is longer by one step than that of the currently selected club.

3. The game control program according to claim 2, wherein a first distance between the current ball position and the indicated position that functions as a threshold value for switching from a first club to a second club, of which the shot distance is shorter by one step, is shorter than a second distance between the current ball position and the indicated position that functions as a threshold value for switching from the second club to the first club.

4. The game control program according to claim 1, wherein
    in case that a club of which the shot distance is longer than a predetermined value is selected, the screen image generating unit generates an image of the golf course, wherein a region that positions nearer than the marker to the current ball position is displayed larger than a farther region, and
    in case that a club of which the shot distance is shorter than the predetermined value is selected, the screen image generating unit generates an image of the golf course, wherein a region that positions farther than the marker to the current ball position is displayed larger than a nearer region.

5. The game control program according to claim 1, wherein, upon receiving a predetermined input, the screen image generating unit switches between a shot screen in which the shot control unit receives an instruction to control a shot by the player's character, and a landing site screen in which the landing point control unit shows the marker indicating the predicted landing point of the ball and in which the instruction for moving the position of the marker is received.

6. A game device comprising:
    a screen image generating unit operative to read out data of a golf course from a storage device, operative to generate an image of the golf course, and operative to display the image on a display device;
    a club selection unit operative to allow a player to select a club that a player's character controlled by the player uses for taking a shot in response to an input of a button provided on an input device;
    a landing point control unit operative to display a marker in the image of the golf course generated by the screen image generating unit, the marker indicating a predicted landing point of a ball when the player's character takes a shot by using the club selected by the club selection unit; and a shot control unit operative to control a shot taken by the player's character, wherein a position of the marker is represented by a two-dimensional polar coordinate system of which an origin point is a current ball position, and upon receiving an instruction for moving the position of the marker, the instruction having been input through a touch panel provided with the display device from a player, in case a distance between the current ball position and an indicated position indicated by the instruction falls within a predetermined range, the landing point control unit moves the marker to a position of an intersection of a first arc and a line connecting the current ball position and the indicated position, wherein a radius of the first arc represents a distance of a shot predicted in case that the player's character takes a shot by using the club currently selected by the club selection unit, and the landing point control unit changes a direction of a shot to be taken by the player's character, the shot being controlled by the shot control unit, to a direction of a line connecting the current ball position and a position of the marker after the move, and in case that the distance between the current ball position and the indicated position falls out of the predetermined range, the landing point control unit allows the club selection unit to select a different club and moves the marker to a position of an intersection of a second arc and a line connecting the current ball position and the indicated position, wherein a radius of the second arc represents a distance of a shot predicted in case that the player's character takes a shot by using a newly selected club, wherein, as the player uses the input device to select the club, the club selection unit moves the marker to an arc that corresponds to a shot distance of the club.

7. The game device according to claim 6, wherein, upon receiving a predetermined input, the screen image generating unit switches between a shot screen in which the shot control unit receives an instruction to control a shot by the player's character, and a landing site screen in which the landing point control unit shows the marker indicating the predicted landing point of the ball and in which the instruction for moving the position of the marker is received.

8. A method for controlling a game comprising:

reading out data of a golf course from a storage device, generating an image of the golf course, and displaying the image on a display device;

selecting a club, by a player that a player's character controlled by the player uses for taking a shot in response to an input of a button provided on an input device;

displaying a marker in the image of the golf course generated, the marker indicating a predicted landing point of a ball when a player's character takes a shot by using the club selected by the selecting; and controlling a shot taken by the player's character, wherein a position of the marker is represented by a two-dimensional polar coordinate system of which an origin point is a current ball position, and said displaying the marker includes, upon receiving an instruction for moving the position of the marker, the instruction having been input through a touch panel provided with the display device from a player, moving, in case a distance between the current ball position and an indicated position indicated by the instruction falls within a predetermined range, the marker to a position of an intersection of a first arc and a line connecting the current ball position and the indicated position, wherein a radius of the first arc represents a distance of a shot predicted in case that the player's character takes a shot by using the club currently selected, and changing a direction of a shot to be taken by the player's character to a direction of a line connecting the current ball position and a position of the marker after the moving, and selecting, in case that the distance between the current ball position and the indicated position falls out of the predetermined range, a different club and moving the marker to a position of an intersection of a second arc and a line connecting the current ball position and the indicated position, wherein a radius of the second arc represents a distance of a shot predicted in case that the player's character takes a shot by using a newly selected club wherein, as the player uses the input device to select the club, the marker is moved to an arc that corresponds to a shot distance of the club.

9. The game control method according to claim 8, further comprising switching between a shot screen in which an instruction to control a shot by the player's character is received, and a landing site screen in which the marker indicating the predicted landing point of the ball is displayed and in which the instruction for moving the position of the marker is received.

* * * * *